(12) United States Patent
Wagner

(10) Patent No.: US 10,873,447 B2
(45) Date of Patent: Dec. 22, 2020

(54) EFFICIENT CONCURRENT SCALAR PRODUCT CALCULATION

(71) Applicant: Visa International Service Association, San Francisco, CA (US)

(72) Inventor: Kim Wagner, Sunnyvale, CA (US)

(73) Assignee: Visa International Service Association, San Francisco, CA (US)

(*) Notice: Subject to any disclaimer, the term of this patent is extended or adjusted under 35 U.S.C. 154(b) by 4 days.

(21) Appl. No.: 16/428,514

(22) Filed: May 31, 2019

(65) Prior Publication Data

US 2019/0363870 A1 Nov. 28, 2019

Related U.S. Application Data

(63) Continuation of application No. PCT/US2019/033933, filed on May 24, 2019.
(Continued)

(51) Int. Cl.
*H04L 9/08* (2006.01)
*H04L 9/00* (2006.01)
(Continued)

(52) U.S. Cl.
CPC ........... *H04L 9/008* (2013.01); *G06F 17/16* (2013.01); *G06Q 20/401* (2013.01); *H04L 9/14* (2013.01);
(Continued)

(58) Field of Classification Search
CPC ...................................................... H04L 9/08
(Continued)

(56) References Cited

U.S. PATENT DOCUMENTS 6,788,788 B1 * 9/2004 Kasahara .............. H04L 9/083
380/277
2015/0269394 A1 9/2015 Bringer et al.

FOREIGN PATENT DOCUMENTS

| WO | 2017037151 | 3/2017 |
| WO | 2018174901 | 9/2018 |
| WO | 2018174901 A1 | 9/2018 |
| WO | 2019055138 A1 | 2/2019 |
| WO | 2019055138 | 3/2019 |

OTHER PUBLICATIONS

Huang et al., "Secure Two-Party Distance Computation Protocol Based on Privacy Homomorphism and Scalar Product in Wireless Sensor Networks", Tsinghua Science and Technology, vol. 21, No. 4, Aug. 2016, pp. 385-396.
(Continued)

*Primary Examiner* — Jacob Lipman
(74) *Attorney, Agent, or Firm* — Kilpatrick Townsend & Stockton LLP

(57) ABSTRACT

A method and system for performing a calculation of a privacy preserving scalar product are provided. A first party and a second party (e.g., a first computer and a second computer) possessing a first vector and a second vector respectively, can concurrently determine the scalar product of the two vectors, without revealing either vector to the other party. Each vector can be masked and then encrypted using a public key of an asymmetric key pair. Using homomorphic encryption operations, the scalar product of the vectors can be determined while the vectors are still encrypted. Each party can compare the scalar product, or a value derived from the scalar product against a predetermined threshold. As an example, two parties can perform the scalar product to compare two biometric templates expressed as vectors without revealing the biometric templates to one another, preserving the privacy of persons corresponding to those biometrics.

18 Claims, 9 Drawing Sheets

Related U.S. Application Data

(60) Provisional application No. 62/676,219, filed on May 24, 2018.

(51) Int. Cl.
*H04L 9/30* (2006.01)
*G06F 17/16* (2006.01)
*H04L 9/14* (2006.01)
*G06Q 20/40* (2012.01)

(52) U.S. Cl.
CPC ........... *H04L 9/30* (2013.01); *G06Q 2220/00* (2013.01); *H04L 2209/04* (2013.01); *H04L 2209/46* (2013.01); *H04L 2209/56* (2013.01)

(58) Field of Classification Search
USPC .......................................................... 380/30
See application file for complete search history.

(56) References Cited

OTHER PUBLICATIONS

Liu et al., "Encrypted Scalar Product Protocol for Outsourced Data Mining", 2014 IEEE 7th International Conference on Cloud Computing, 2014, pp. 338-343.
PCT/US2019/033933 , "International Search Report and Written Opinion", dated Sep. 16, 2019, 9 pages.
Amirbekyan et al., "A New Efficient Privacy-Preserving Scalar Product Protocol," http://hdl.handle.net/10072/17249, 2007, 7 pages.
Paillier Cryptosystem, Wikipedia, en.wikipedia.org/wiki/Paillier_cryptosystem, last modified on Feb. 28, 2013, 5 page.
Yao, "Protocols for Secure Computations," extended Abstract, 1982 IEEE, 5 pages.

\* cited by examiner

EFFICIENT CONCURRENT SCALAR PRODUCT CALCULATION

CROSS REFERENCE TO RELATED APPLICATIONS

This application is a continuation application of PCT/US2019/033933, filed on May 24, 2019, which is a PCT application which claims priority to U.S. patent application No. 62/676,219, filed on May 24, 2018, all of which are herein incorporated by reference in their entirety.

BACKGROUND

In many cases, the computers can simply transmit their data to one another for comparison, particularity if the data is non-private. As an example, a user may want to check if local software is up to date (i.e., the software is the most recently released stable version of that software available). The user may have no issue with transmitting data about the software to an external server for comparison. However, in some cases, particularly those involving private data or personally identifying information (e.g., medical records, payment account numbers, biometrics), a user may not want to transmit that data to another external computer, for fear that the external computer may be operated by a fraudulent or malicious user or organization.

Fortunately, there are techniques available that allow two or more computers to compare data or perform calculations without revealing their respective data to one another, such as secure multi-party computation techniques. Unfortunately, these techniques are often slow, complex, and require large numbers of computing operations. If participating computers have a bad connection, the likelihood of secure multi-party computation failure rises significantly. Additionally, the large number of communications and computing operations make such protocols unsuitable for time sensitive applications or in low performance computing environments.

Embodiments solve these and other problems, individually and collectively.

SUMMARY

Embodiments of the invention are directed to methods and systems for securely and concurrently calculating the scalar product (or "dot" product) of two vectors. A first computer and a second computer can possess a first and second vector respectively, and can calculate the scalar product of the first and second vector concurrently, without the first computer revealing the first vector to the second computer and without the second computer revealing the second vector to the first computer. Each computer can compare the scalar product or a value derived from the scalar product to a predetermined threshold. Provided that the scalar product or the value derived from the scalar product exceeds the predetermined threshold, the first computer and the second computer can perform an interaction with one another. For example, the interaction may comprise the second computer issuing an access token to the first computer.

As an example, a biometric authorization system (second computer) can compare a biometric vector (i.e., a vectorized biometric instance) provided by a first computer (operated or owned by a user corresponding to the biometric vector) to a biometric vector stored at a second computer, and the second computer can issue an access token (such as a payment token, or a token that enables the user to access a building) if the biometrics match. However, the second computer may not want to give the user a copy of its stored biometric vector, as the user could be a fraudster attempting to steal the biometric vector in order to perform identity theft. Likewise, the user may be unwilling to give the second computer a copy of their biometric vector, as the second computer may be operated by a fraudster. Embodiments can be used to calculate the scalar product and perform a comparison of the two biometric instances using the scalar product, without the user revealing their respective biometric vector to the second computer, and without the second computer revealing its respective biometric vector to the user. In this way, the user can be authorized without any risk of exposing sensitive data.

Embodiments provide an improvement over conventional systems because embodiments enable the scalar product to be calculated without performing as many communications between the computers or entities, providing an improvement in speed and reliability. In embodiments of the present disclosure, the first computer and second computer concurrently calculate the scalar product, and neither the first computer or the second computer needs to transmit the square magnitude of the first vector, a or the square magnitude of the second vector $\beta$ to the other computer. This reduces the number of messages sent between computers, improving the speed, efficiency, and reliability of the protocol relative to conventional systems.

One embodiment is directed to a method comprising: transmitting, by a first computer, to a second computer, a first public key, a second public key, a first encrypted masked vector, and a first encrypted random vector, wherein the first encrypted masked vector is a first masked vector encrypted using the first public key, and the first encrypted random vector is a first random vector encrypted using the second public key; receiving, by the first computer, from the second computer, a third public key, a fourth public key, a second encrypted masked vector, and a second encrypted random vector, wherein the second encrypted masked vector is a second masked vector encrypted using the third public key and the second encrypted random vector is a second random vector encrypted using the fourth public key; receiving, by the first computer, from the second computer, a third permuted encrypted difference vector and a fourth permuted encrypted difference vector, wherein the third permuted encrypted difference vector is encrypted using the first public key and permuted using a third permutation, and wherein the fourth permuted encrypted difference vector is encrypted using the second public key and permuted using a fourth permutation; producing, by the first computer, a third permuted difference vector by decrypting the third permuted encrypted difference vector using a first private key corresponding to the first public key; producing, by the first computer, a fourth permuted difference vector by decrypting the fourth permuted encrypted difference vector using a second private key corresponding to the second public key; and calculating, by the first computer, a scalar product of a vector and a second vector based on the first masked vector, the first random vector, the third permuted difference vector and the fourth permuted difference vector.

Another embodiment is directed to a first computer comprising: a processor; and a non-transitory computer readable medium coupled to the processor, the non-transitory computer readable medium comprising code, executable by the processor for implementing the above-noted method.

These and other embodiments are described in detail below. A better understanding of the nature and advantages of embodiments may be gained with reference to the following detailed description and the accompanying drawings.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "secure element" may refer to a component that can perform a function securely. A secure element may be a memory that securely stores data, such that access to the data is protected. An example of a "secure element" is a trusted execution environment (TEE), a secure area of a processor. Another example of a secure element is a universal integrated-circuit card (UICC), a secure smart card. An additional example of a secure element is an embedded secure element, an embedded hardware component in a larger mechanical or electrical system.

A "vector" may refer to an ordered list of components. The components of a vector may be numerical, e.g., an exemplary vector may have three components: $\vec{c}=[1,2,3]$. The components of a vector may be associated with labels, for example, a second exemplary vector $\vec{d}$ may have three components: $\vec{d}=[\text{height: 68 inches, weight: 140 lbs, age: 25 years}]$. Mathematical operations may be applied to vectors, e.g., two vectors may be added together or subtracted from one another. A "random vector" may refer to an ordered list of components that are randomly or pseudorandomly generated, e.g., using a random or pseudorandom number generator. A "difference vector" may refer to a vector that equals the difference between two vectors, e.g., $\vec{e}=\vec{d}-\vec{c}$. A "masked vector" may refer to a vector sum of a vector and a random vector. The term "vectorization" may refer to any process by which a set of data is converted into a vector, e.g., the process by which a person's height, weight, and age is converted into a vector comprising components corresponding to that person's height, weight, and age.

A "permutation" may refer to a way in which something may be ordered or arranged. The term "permuted" may indicate that something has been ordered or arranged via a permutation. For example, a permuted vector may refer to a vector that has been rearranged in accordance with a permutation.

A "user" may refer to a person or thing that employs some other thing for some purpose. A user may include an individual that may be associated with one or more personal accounts and/or user devices. The user may also be referred to as a cardholder, account holder, or consumer in some embodiments.

A "resource" may refer to something that may be used by an entity or transferred between entities. Examples of resources include goods, services, information, and/or access to restricted locations.

A "resource provider" may refer to an entity that can provide resources. Examples of resource providers include merchants, governmental agencies, etc. A resource provider may operate a resource provider computer.

A "communication device" may comprise any suitable device that may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include desktop computers, videogame consoles, mobile phones (e.g., cellular phones), PDAs, tablet computers, net books, laptop computers, personal music players, hand-held specialized readers, smart cards, etc. Further examples of communication devices include wearable devices, such as smart watches, fitness bands, ankle bracelets, rings, earrings, etc., as well as vehicles with remote or direct communication capabilities.

An "interaction" may refer to a reciprocal action, effect or influence. For example, an interaction could be an exchange or transaction between two or more parties.

An "access terminal" may be any suitable device that provides access to a remote system. An access terminal may also be used for communicating with a merchant computer, a transaction processing computer, an authentication computer, or any other suitable system. An access terminal may generally be located in any suitable location, such as at the location of a merchant. An access terminal may be in any suitable form. Some examples of access terminals include point of sale (POS) terminals, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access terminal may use any suitable contact or contactless mode of operation to send or receive data from, or associated with, a user mobile device. In some embodiments, where an access terminal may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "access network" may refer to a network associated with an access terminal. An access network may include an array of devices which support the access terminal by providing some needed functionality. For example, an access network may be an array of antennas or beacons (such as Wi-Fi or Bluetooth beacons) designed to communicate with a collection of mobile devices on behalf of the access terminal. An access network may include a local area network, wide area network, or networks such as a cellular network or the Internet.

The term "biometrics instance" may include information related to a biological observation. A biometric instance may include biometric data corresponding to a biometric sample, or a biometric template derived from the biometric sample or the biometric data. A biometric instance may be used to verify the identity of a user. A biometric instance may be captured via a biometric interface, hardware used to capture biometric instances. For example, a biometric instance may be captured via a biometric interface such as an iris scanner, comprising an infrared light source and a camera. Examples of biometric instances include digital representations of iris scans (e.g., binary codes that represent an iris), fingerprints, voice recordings, face scans, etc. Biometric instances may be stored in an encrypted format and/or on a secure memory of a mobile device.

The term "cryptographic key" may refer to something used in encryption or decryption. As an example, a cryptographic key can refer to a product of two large prime numbers. A cryptographic key may serve as an input in a cryptographic process or cryptosystem, such as RSA or AES, and may be used to encrypt plaintext and produce a ciphertext output, or decrypt ciphertext and produce a plaintext output.

The term "plaintext" may refer to text that is in a plain form. For example, plaintext could refer to text which a human or a computer could read without any processing, such as the phrase "hello, how are you?" It may also refer to text which is in an unencrypted form. Numbers or other symbols may also qualify as plaintext.

The term "ciphertext" may refer to text that is that is in an encrypted form. For example, this could refer to text which must be decrypted before it can be understood by a human or computer. Ciphertext may be generated by any number of cryptographic algorithms, such as RSA or AES.

An "acquirer" may typically be a business entity (e.g., a commercial bank) that has a business relationship with a particular merchant or other entity. Some entities can perform both issuer and acquirer functions. Some embodiments may encompass such single entity issuer acquirers. An acquirer may operate an acquirer computer, which can also be generically referred to as a "transport computer."

An "authorizing entity" may be an entity that authorizes a request. Examples of an authorization entities may include issuers, governmental agencies, document repositories, access administrators, etc. An "issuer" may typically refer to a business entity (e.g., a bank) that maintains an account for a user. An issuer may also issue payment credentials stored on a mobile device, such as a cellular telephone, smart cart card, tablet, or laptop to the consumer. An authorizing entity may operate an authorization computer.

"Authentication data" may include any data suitable for proving that something is true and valid. Authentication data may be obtained from a user or a device that is operated by the user. Examples of authentication data obtained from a user may include PINs (personal identification numbers), passwords, etc. Examples of authentication data that may be obtained from a mobile device may include device serial numbers, hardware security element identifiers, device fingerprints, phone numbers, IMEI numbers, biometric instances stored on the mobile device, etc.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact contactless mode. In some embodiments, a mobile device can function as a payment device (e.g., a mobile device can store and be able to transmit payment credentials for a transaction).

A "credential" may be any suitable information that serves as reliable evidence of worth, ownership, identity or authority. An "access credential" may be a credential that may be used to gain access to a particular resource (e.g., a good, service, location, etc.). A credential may be a string of numbers, letters, or any other suitable characters, or any object or document that can serve as confirmation. Examples of credentials include identification cards, certified documents, access cards, passcodes and other login information, payment account numbers, access badge numbers, payment tokens, access tokens, etc.

"Payment credentials" may include any suitable information associated with an account (e.g., a payment account and/or payment device associated with the account). Such information may be directed related to the account or may be derived from information related to the account. Examples of account information may include a PAN (primary account number or "account number"), user name, expiration date, CVV (card verification value), dCVV (dynamic card verification value), CVV2 (card verification value 2), etc. Payment credentials may be any information that identifies or is associated with a payment account. Payment credentials may be provided in order to make a payment from a payment account. Payment credentials can also include a user name, an expiration date, a gift card number or code, and any suitable information.

A "token" may be a substitute value for a real credential. A token may be a type of credential, and may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token 4900 0000 0000 0001" may be used in place of a PAN "4147 0900 0000 1234." In some embodiments, a token may be "format preserving" and may have a numeric format that conforms to the account identifier used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generate such that the recovery of the original PAN or other account identifier from the token value may not be computationally derived. Further, in some embodiments, the token format may be configured to allow the entity receiving the token to identify it as a token and recognize the entity that issued the token.

An "authorization request message" may be an electronic message that is sent to request authorization for a transaction. In some embodiments, an authorization request message may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. It may be generated by an issuing financial institution or a payment processing network. The authorization response message may include, by way of example only, one or more of the following status indicators: Approvaltransaction was approved; Decline—transaction was not approved: or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "device code" or "device identifier" may be a code that is specifically associated with a device (e.g., only one device). The device code can be derived from any device specific information including, but not limited to include one or more of a secure element identifier (SE ID), an IMEI number, a phone number, a geo-location, a device serial number, a device fingerprint, etc. Such codes may be derived from such information using any suitable mathematical operation including hashing and/or encryption. Device codes may include any suitable number and/or type of characters.

DETAILED DESCRIPTION

Figure 1:
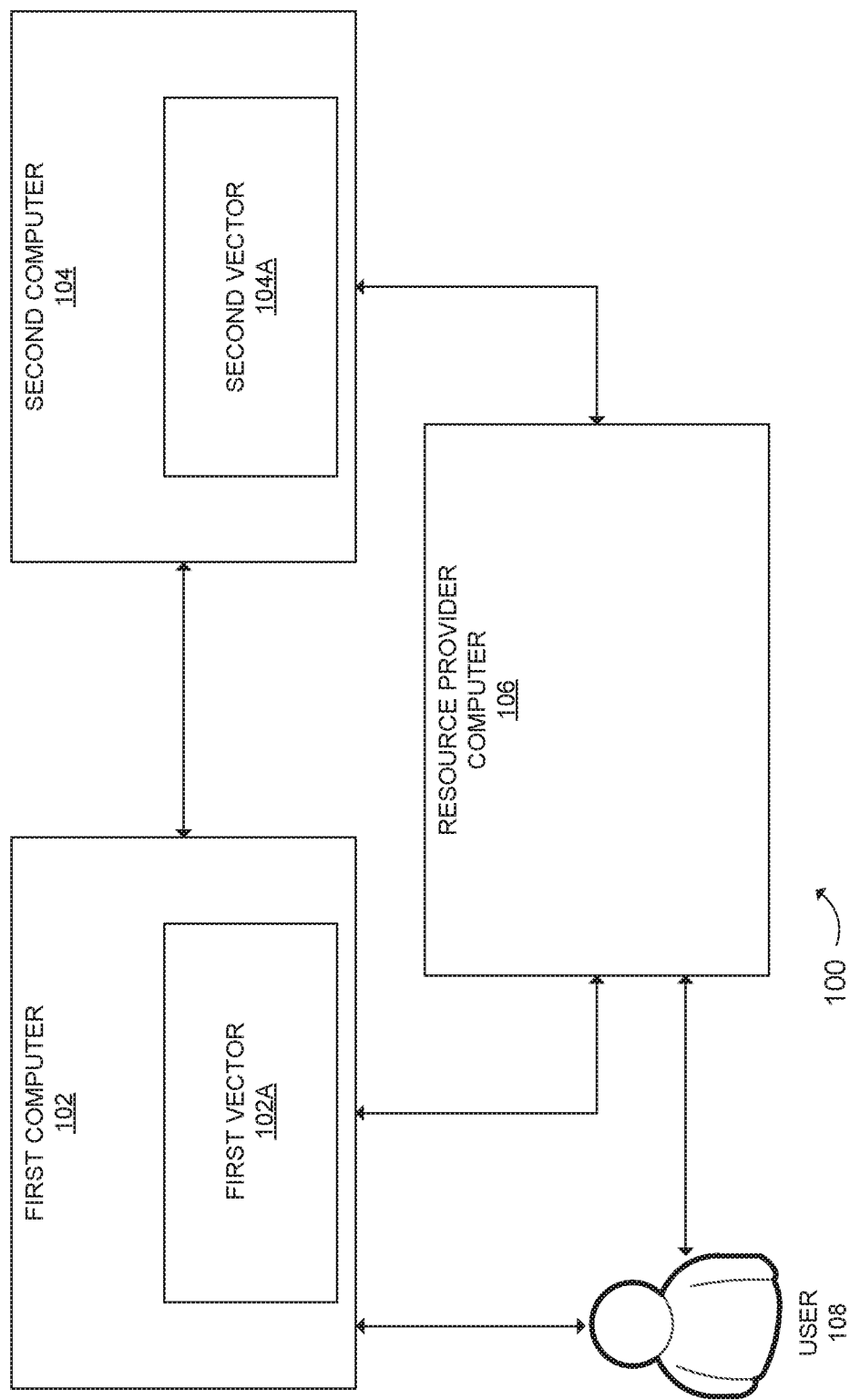
FIG. 1 shows a block diagram of an exemplary system according to some embodiments of the invention.

Because embodiments are directed to privacy-preserving methods and systems for calculating the scalar product of two vectors, a brief primer on vectors may be useful in better understanding embodiments.

While the term vector has different meanings throughout the sciences, generally a vector refers to an ordered list of components. In some cases, a vector can also be represented as a paired magnitude and angle or direction. For example, the vector [north: 1 mile, west: 1 mile] represents a straight path between a first point in space and a second point in space exactly one mile north and one mile west of the first point. This vector can alternatively be represented as [magnitude: 1.414 miles, direction: 45 degrees], indicating that the vector points 1.414 miles, 45 degrees clockwise from north. Both representations are equivalent because they describe the same path. As variables in mathematical equations, vectors are often represented by a symbol with an arrow over the top, for example: $\vec{c}$. Vectors are subject to many mathematical relationships that other variables are subject to, for example, similar vectors can be added together or subtracted from one another.

Many forms of data can be vectorized, i.e., converted into vectors or represented by vectors. As an example, a person's health statistics (e.g., height, weight, age) could be represented by a vector such as [height: 68 inches, weight: 140 lbs, age: 25 years]. Vectorization is useful because it allows data to be compared objectively using vector operations that can be quickly performed by a computer.

For example, one method of comparing two sets of data is vectorising each set of data and determining the angle between the two vectors. Vectors that are alike have a small angle between them, while vectors that are different have a large angle between them. The angle between two identical vectors (e.g., [north: 1 mile, west: 0 miles] and [north: 1 mile, west: 0 miles]) is zero, while two orthogonal vectors (e.g., [north: 1 mile, west: 0 miles] and [north: 0 miles, west: 1 mile]) have a 90 degree angle between them, and two opposite vectors (e.g., [north: 1 mile, west: 0 miles] and [south: 1 mile, west: 0 miles]) have a 180 degree angle between them. The angle between two vectorized sets of data (e.g., health statistics corresponding to a first person and health statistics corresponding to a second person), or a trigonometric function (e.g., cosine) of the angle between two vectorized sets of data can be used as a similarity or difference metric to evaluate the similarity or difference between those two sets of data.

Similarly, vector operations such as the scalar product can be used to evaluate the similarity or difference between two vectors. The scalar product of two vectors can be calculated by multiplying each component of the first vector by the corresponding component of the second vector and summing the result, i.e.:

$$\vec{c} \cdot \vec{d} := \Sigma_{i=1}^{n} c_i d_i$$

As an example, the scalar product of $\vec{c}=[1, 3, -5]$ and $\vec{d}=[4, -2, -1]$ equals:

$$(1*4)+(3*-2)+(-5*-1)=3$$

The scalar product is useful because, among other reasons, it is proportional to the angle between the two vectors, as shown by the following equality:

$$\vec{c} \cdot \vec{d} = \|\vec{c}\| \|\vec{d}\| \cos(\theta)$$

Where $\|\vec{c}\|$ is the magnitude (i.e., the "size") of vector $\vec{c}$, $\|\vec{d}\|$ is the magnitude of vector $\vec{d}$, and $\theta$ is the angle between the two vectors. As such, the scalar product of two vectorized sets of data can be used to determine similarities or differences between those sets of data.

Vectorization can be used to simplify or accelerate the comparison of data such as biometrics. In one example, a captured biometric can be compared against a biometric or biometric template stored in a database, in order to identify or authenticate a person corresponding to the biometric. One example is fingerprinting, whereby images of a person's fingerprints are captured (biometric) and compared to fingerprints stored in a fingerprint database in order to identify that person. If the captured fingerprints and the fingerprints stored in the fingerprint database are vectorized, it is possible to determine if the captured fingerprints match a set of fingerprints stored in the fingerprint database using vector operations, such as calculating the scalar product of the captured vectorized fingerprints and the vectorized fingerprints stored in the database.

Exact methods of vectorising biometrics or biometric templates are beyond the scope of this disclosure. However, the following example is provided in order to illustrate how an exemplary biometric may be vectorized.

An iris code (a biometric typically comprising 256 bytes that can be used to perform iris recognition) can be vectorized by converting it into a vector with 256 components, each component corresponding to one byte of the corresponding iris code. As an alternative, the iris code could be converted into a binary vector comprising 2048 components, each comprising one bit of the corresponding iris code, or alternatively, a vector with 128 components, each component corresponding to two bytes of the corresponding iris code. There are a number of ways in which a biometric, such as an iris code can be converted into a vector, and other biometrics (e.g., fingerprints, facial scans, etc.) can be converted into vectors using similar methods.

While there are numerous methods and techniques for comparing biometrics, vectorized or otherwise, few techniques are oriented toward preserving the privacy of the subject. As an example, when a person is subject to a fingerprint scan, they typically have to provide their fingerprints (the biometric) to an entity (e.g., a law enforcement agency) in order for the entity to compare those fingerprints to fingerprints stored in a database. This however exposes the person to the risk of identity theft. A fraudster can impersonate a legitimate entity and request the person's biometrics as part of an apparently legitimate authentication request (e.g., via an email phishing attack). The fraudster can then use those biometrics in order to impersonate the person as part of an identity theft scheme.

Embodiments of the present disclosure, however, provide for methods for two entities (e.g., two computers, such as a smart phone belonging to a user and a remote server) to calculate the scalar product of two vectors (e.g., two vectorized biometrics) without either entity revealing its respective biometric to the other entity. As such, a remote server can determine if a person's biometric matches a biometric stored in a biometric database without actually receiving the person's biometric itself. This results in a tangible increase in information security and prevents identity theft schemes, such as the one described above.

Embodiments accomplish this by using additive homomorphic encryption, using cryptosystems such as the Paillier cryptosystem. Additive homomorphic encryption allows the participating entities to calculate the sum of encrypted data without first decrypting the data. Particularly, in the Paillier cryptosystem, the product of two ciphertexts (i.e., encrypted data) is equal to the encrypted sum of the corresponding plaintexts:

$$E(c)*E(d)=E(c+d)$$

Embodiments of the present disclosure make use of this property to enable two computers to calculate the scalar product of two vectors while the components of the vectors are encrypted. As the private keys used to decrypt the vectors are only known by their respective entity (i.e., a first computer knows private keys that are unknown to a second computer, and vis-versa), each entity can prevent the other entity from learning of its vector, while still calculating the scalar product of the two vectors.

FIG. 1 shows a block diagram of an exemplary system 100, comprising a first computer 102, a second computer 104, a resource provider computer 106, and a user 108. The computers of system 100 may be in operative communication with one another via one or more communications networks.

A communications network can take any suitable form, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the entities, providers, users, devices, computers and networks may be transmitted using a secure communications protocol such as, but not limited to, File Transfer Protocol (FTP); HyperText transfer Protocol (HTTP); Secure HyperText Transfer Protocol (HTTPS), Secure Socket Layer (SSL), ISO (e.g., ISO 8583) and/or the like.

Methods according to embodiments enable the first computer 102 and the second computer 104 to calculate the scalar product of a first vector 102A and a second vector 104A without each computer revealing their respective vector or the calculated scalar product to the other computer. Through a series of phases, described below with reference to FIGS. 4-7, the first computer 102 and second computer 104 can prepare and exchange information that allows the first computer 102 and second computer 104 to concurrently calculate the scalar product of the first vector 102A and the second vector 104A. The first computer 102 and second computer 104 can each concurrently compare the calculated scalar product or a value derived from the scalar product (e.g., an angle between the two vectors) to predetermined thresholds. If the scalar product of the value derived from the scalar product exceeds the predetermined thresholds, the first computer 102 and second computer 104 may perform an interaction with one another. This interaction can additionally comprise a resource provider, who may own or operate a resource provider computer 106.

Exemplary interactions are described in greater detail below with reference to FIGS. 8 and 9. Generally, the comparison of the scalar product or a value derived from the scalar product to a predetermined threshold may be performed as part of an authentication procedure, and the interaction may take place provided authentication was successful (i.e., the scalar product or a value derived from the scalar product exceeds the predetermined threshold). For example, if the first vector 102A is a biometric vector stored on the first computer 102 (e.g., a smart phone owned by user 108) corresponding to the user 108, and the second vector 104A is a biometric vector corresponding to the user 108 that is stored on the second computer 104 (e.g., a biometric vector on file corresponding to user 108), the scalar product of the first vector 102A and the second vector 104A may be used to authenticate the user 108. Once the user 108 is authenticated, an interaction can take place, such as a payment transaction between the user 108 and a merchant (i.e., a resource provider operating resource provider computer 106).

Figure 2:
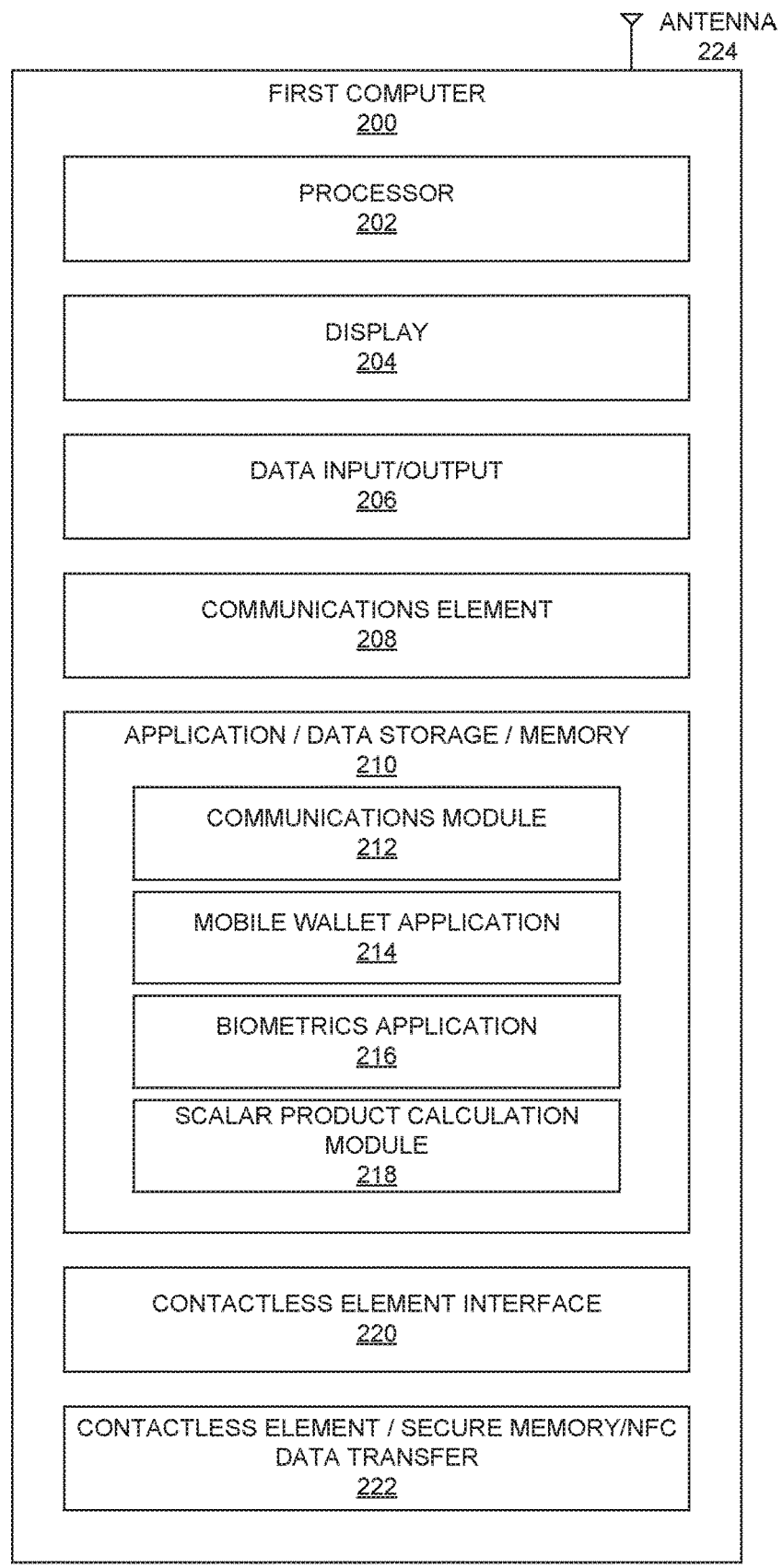
FIG. 2 shows a block diagram of an exemplary first computer according to some embodiments.

FIG. 2 shows an exemplary first computer 200 according to some embodiments. Particularly, FIG. 2 shows the first computer 200 as a mobile device (e.g., a smart phone). It should be understood however, that the first computer 200 may take many forms, such as any appropriate communications device as defined above in the terms section.

First computer 200 may include circuitry that is used to enable certain device functions, such as wireless communication or telephony. The functional elements responsible for enabling those functions may include a processor 202 that can execute instructions that implement the functions and operations of the device. Processor 202 my access data storage 210 (or another suitable memory region or element) to retrieve instruction or data used in executing the instructions. Data input/output element 206, such as a keyboard or touchscreen, may be used to enable a user to operate the first computer 200 (for example, allowing the user to navigate to a mobile wallet application 214). Data input/output 206 may also be configured to output data (via a speaker, for example). Display 204 may also be used to output data to a user. Communications element 208 may be used to enable data transfer between first computer 200 and a wired or wireless network (via antenna 224, for example), enable data transfer functions, and may be used to assist in connectivity to the Internet or another network. First computer 200 may also include contactless element interface 220 to enable data transfer between contactless element 222 and other elements of the device. Contactless element 222 may include a secure memory and a near field communication data transfer element (or another form of short range communication technology). As noted, cellular phones, smart phones, wearable devices, laptop computers, or other similar devices are examples of mobile devices, and thereby examples of first computers in accordance with embodiments.

The data storage 210 may comprise a computer readable medium that may also comprise a number of software modules, such as a communications module 212, a mobile wallet application 214, a biometrics application 216, and a scalar product calculation module 218.

The communications module 212 may comprise code enabling the processor 202 to implement or enable communications between the first computer 200 and other devices, such as other mobile devices, access terminals, or a second computer. The communications module 212 may allow communication according to any appropriate protocol, such as TCP, UDP, IS-IS, OSPF, IGRP, EIGRP, RIP, BGP, etc. It may enable secure communications by enabling the processor 202 to establish a secure or encrypted communication channel between the first computer 200 and other devices. For example, the communication module 212 may comprise code executable by the processor 202 for performing a key exchange (such as a Diffie-Hellman key exchange) between mobile device 200 and another device. The communication module 212 may further allow the transmission of access tokens, including payment tokens, to other devices, such as an access terminal, in addition to allowing the transmission of encrypted or unencrypted vectors and cryptographic keys.

The mobile wallet application 214 may comprise code enabling the first computer 200 to manage tokens. For example, the mobile wallet application 214 may comprise code enabling the processor 202 to retrieve access tokens stored in the secure memory 222 via contactless element interface 220. The mobile wallet application 214 may further comprise code enabling the first computer 200 to display any suitable token information, for example, the time and date during which an access token was provisioned, an alias or identifier for the access token, the time and date of the most recent interaction or transaction involving the access token, etc. Further the mobile wallet application 214 may comprise code enabling the processor 202 to display a graphical user interface (GUI) that enables a user to activate token related functionality. Further, the mobile wallet application 214 may comprise code enabling the first computer 200 to send tokens to an access terminal, for example, during a transaction with a merchant.

Biometrics application 216 may comprise code enabling the first computer 200 to capture biometric instances via data input/output 206. For example, during an enrollment process (such as enrollment phase 402 from FIG. 4, described in further detail below), the first computer 200 may be used to capture a biometric instance such as a face scan, using a data input/output element 206 such as a camera. Biometrics application 216 may be used to capture this biometric instance and store the biometric instance, either in encrypted or unencrypted form on secure memory 220. Biometrics application 216 may additionally include code or instructions, executable by the processor 202 to vectorize biometric instances, i.e., generate biometric vectors corresponding to those biometric instances. Biometrics application 216 may also include code or instructions, executable by the processor 202 for participating in a biometric based interaction system, such as a biometrics-based transaction system. These code or instructions may include code for communicating with an access terminal and performing functions such as transmitting biometric vectors to the access terminal.

The scalar product calculation module 218 may comprise code or instructions, executable by processor 202 for performing a privacy-preserving calculation of the scalar product of two vectors according to some embodiments. These methods may be better understood with reference to FIGS. 4-7 below. The code or instructions may include the generation of random number or random vectors, the generation of masked vectors, private cryptographic keys (including additive homomorphic cryptographic keys, such as Paillier keys), encrypting and decrypting vectors, generating negation vectors, difference vectors, permutations, calculating square magnitudes, and calculating the scalar product of two vectors, among other things, as described below with reference to FIGS. 4-7.

Figure 3:
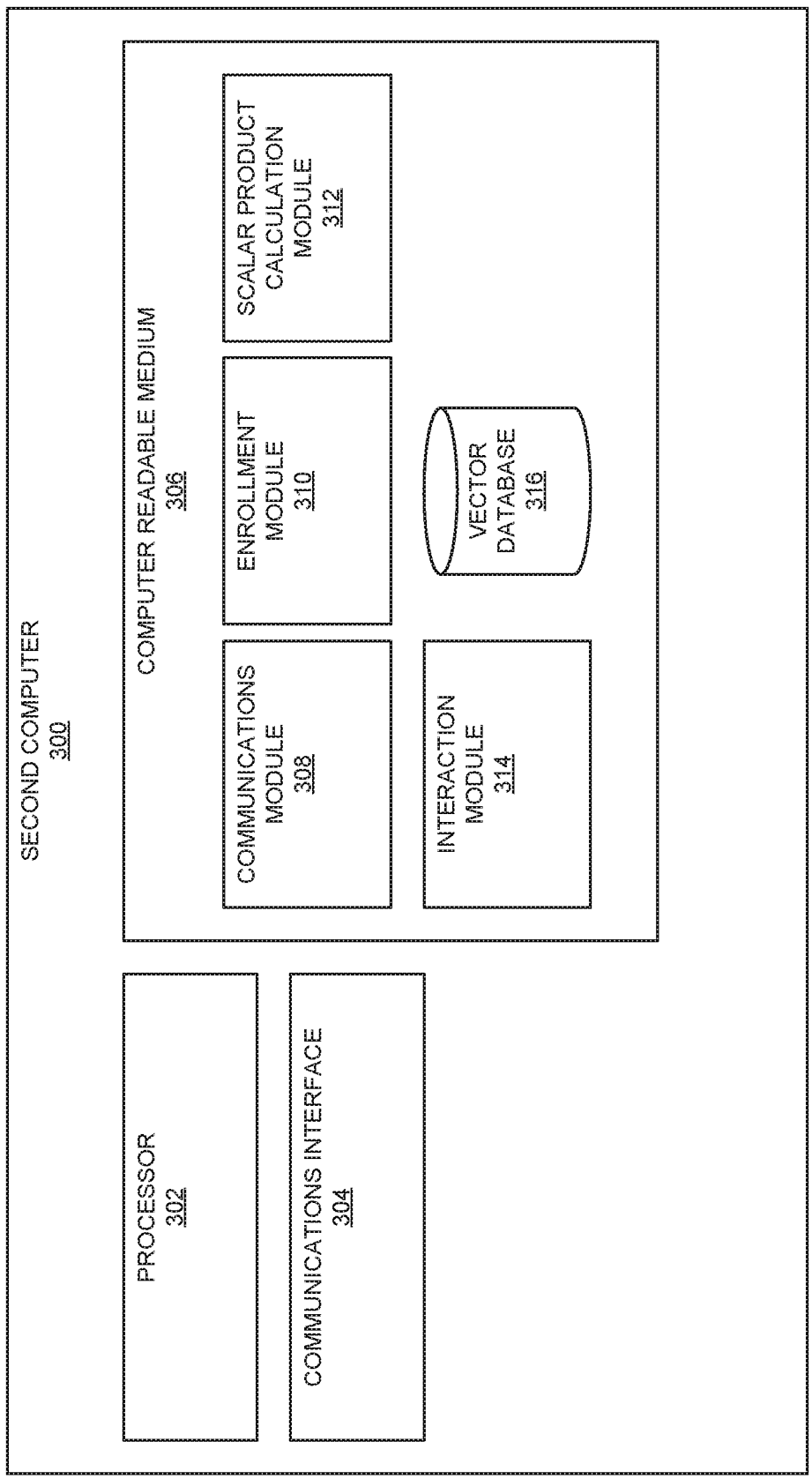
FIG. 3 shows a block diagram of an exemplary second computer according to some embodiments.

FIG. 3 shows an exemplary second computer 300 according to some embodiments of the present disclosure. The second computer 300 may comprise a processor 302, a communications interface 304, and a computer readable medium 306. The computer readable medium 306 may comprise a number of software modules, including a communications module 308, an enrollment module 310, a scalar product calculation module 312, an interaction module 314, and a vector database 316, among others.

Processor 302 may be any suitable processing apparatus or device as described in the terms section above. Communications interface 304 may comprise a network interface that enables the second computer 300 to communicate with other computers or systems (e.g., the first computer) over a network such as the Internet.

Communication module 308 may comprise code or software, executable by processor 302 for establishing communication between second computer 300 and other entities, including the first computer. As an example, communications module 308 may comprise code enabling the generation of UDP (User Datagram Protocol) or TCP (Transmission Control Protocol) packets, or any other appropriate form of network communication. Second computer 300 may use the communications module 308 to transmit and receive data from entities, such as the first computer. These data may include vectors, encrypted, permuted, or otherwise, and cryptographic keys, as described below with reference to first transmission phase 406 and second transmission phase 408 of FIG. 4.

Enrollment module 310 may comprise code enabling a user (e.g., user 108 from FIG. 1) to enroll in a vector-based authentication system, such as a biometric vector authentication system. In some methods according to embodiments, enrollment may be optional. As such, enrollment module 310 may be optional as well. The enrollment module 310 may comprise code enabling the second computer 300 to associate a biometric vector corresponding to a user or a first computer to an identity of the user or an identifier corresponding to the user. For example, the enrollment module 310 may comprise code enabling the second computer 300 to associate a biometric vector corresponding to an iris scan to a user "John Doe." The enrollment module 310 may additionally comprise code enabling the second computer 300 to store the exemplary biometric vector, in association with an identifier corresponding to "John Doe," in biometric database 316. At a later time, a first computer corresponding to "John Doe" (e.g., John's smart phone) and the second computer 300 can perform a privacy-preserving scalar product calculation of the biometric vector stored in biometric database 318 and a biometric vector stored on the first computer, in order to authenticate John Doe and perform an interaction.

Scalar product calculation module 312 may comprise code, executable by processor 302, for performing a privacy-preserving scalar product calculation according to some embodiments. Privacy-preserving scalar product calculations may be better understood with reference to the flowcharts of FIGS. 4-7. Scalar product calculation module 312 may comprise code enabling the generation of random vectors, masked vectors, cryptographic keys, permuted vectors, etc., as described below, in addition to mathematical operations used to calculate the sums of vectors, differences between vectors, and the magnitude or square magnitude of vectors.

Interaction module 314 may comprise code, executable by the processor 302 for performing an interaction with the first computer. This interaction may comprise, for example, authenticating the first computer to a resource provider, such that the first computer or a user associated with the first computer can gain access to a resource. For example, the resource provider may be a merchant, the resource may be a good or service that a customer wishes to buy, the first computer may be a smart phone owned by the customer, and the second computer 300 may be a server computer associated with a payment processing network. The interaction may comprise enacting a payment transaction between the user and the merchant, and interaction module 314 may comprise code, executable by processor 302 for enacting the payment transaction between the user and the merchant.

As a second exemplary interaction, a resource provider may be a computer system controlling access to a building via a locked, computerized door. The interaction between the first computer and second computer 300 may comprise the second computer allowing an owner of the first computer to access the building, e.g., by sending a control signal to the resource provider computer instructing the door be opened, or by providing the first computer with an access token or another credential that the first computer can provide to the resource provider computer, such that the resource provider computer opens the door.

The vector database 316 may comprise any appropriate database, file, or memory structure containing vectors. These vectors may include, for example, biometric vectors corresponding to a plurality of enrolled users. Second computer 300 may retrieve a vector from vector database 316 in order to calculate the scalar product of that vector and another vector corresponding to a first computer.

Figure 4:
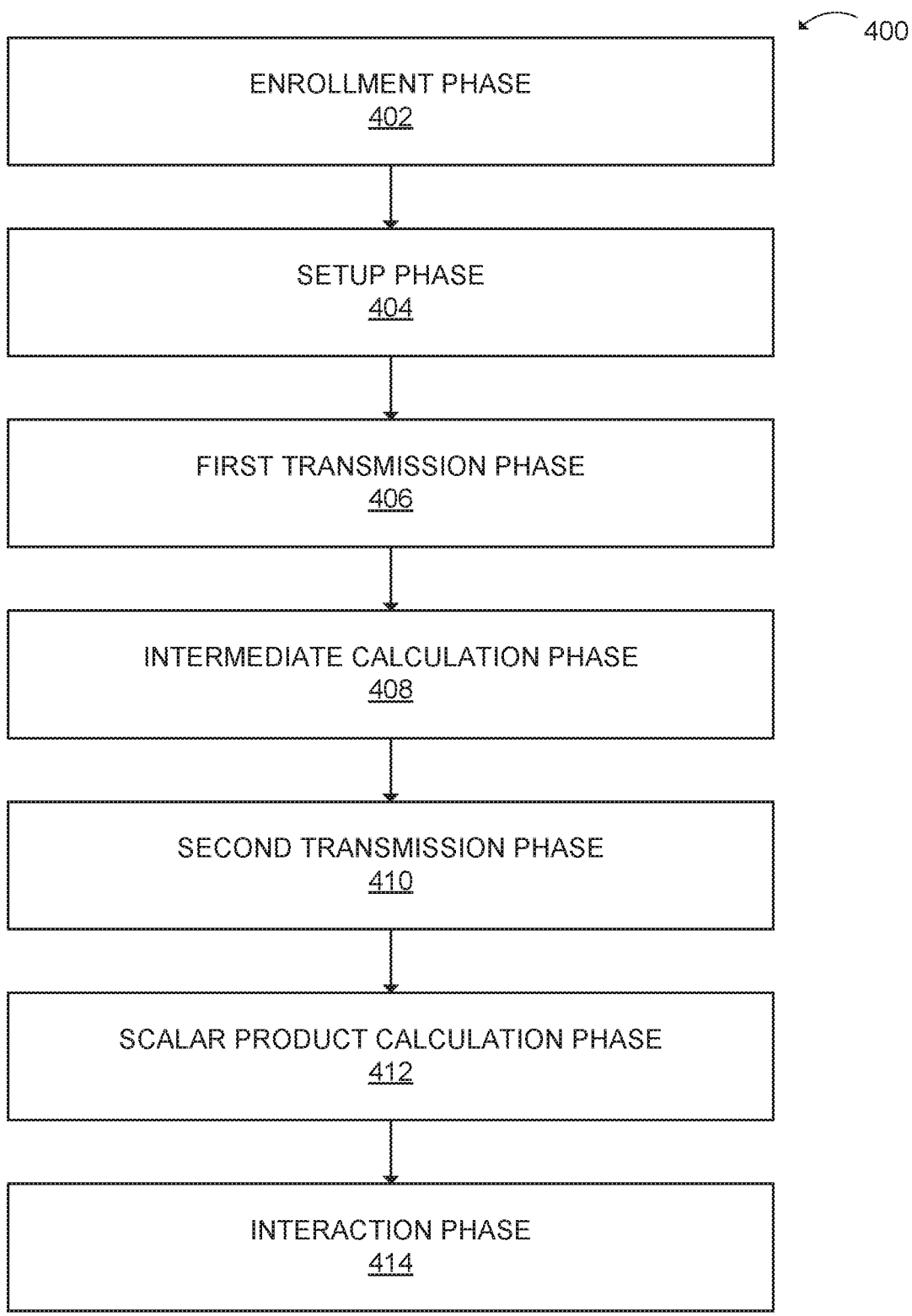
FIG. 4 shows a flowchart overview of a method of calculating the scalar product of two vectors and performing an interaction according to some embodiments.

FIG. 4 shows a flowchart overview of a method 400 of calculating the scalar product of a first vector $\vec{a}$ and a second vector $\vec{b}$ according to some embodiments. The method is divided into seven phases: enrollment phase 402, setup phase 404, first transmission phase 406, intermediate calculation phase 408, second transmission phase 410, scalar product calculation phase 412, and interaction phase 414.

Enrollment phase 402 may be optional, i.e., in some embodiments, enrollment phase 402 may be performed and in other embodiments, enrollment phase 402 may not be performed. The characteristics of enrollment phase 402 may depend on the characteristics of the first vector $\vec{a}$ and second vector $\vec{b}$, and of the nature of the interaction performed in the interaction phase 414.

As an example, the vectors may correspond to biometric instances, and the scalar product of the two vectors may correspond to the similarity between the two biometric instances. As such, the scalar product may be calculated in order to determine whether the two biometric instances match to a sufficient degree of certainty (e.g., 75% match, 95% match, 99% match, etc.). In this case, enrollment phase 402 may comprise a biometric enrollment process. This biometric enrollment process may comprise, for example, capturing a biometric from an enrolling user (for example, by capturing an image of the user's iris, performing a thumb or fingerprint scan, etc.), converting the captured biometric (e.g., into an iris code or other appropriate digital representation of the biometric), and securely storing the biometric instance (e.g., in a secure element on a first computer and/or in a secure database on a second computer.

As stated above, the characteristics of enrollment phase 402 may depend on the characteristics of interaction phase 414 and the interaction. As one example, method 400 of FIG. 4 could be applied to a biometric authorization system for making payments. A customer's biometric instance, represented as a first vector $\vec{a}$, could be compared to the customer's biometric instance, represented as a second vector $\vec{b}$ and stored on a payment processing server. If the biometric vectors match (determined based on the scalar product of the first vector and the second vector), the payment processing server can authenticate the customer and approve a transaction (i.e., the interaction of interaction phase 414) between the customer and a merchant. In this case, as the interaction is a transaction, the enrollment phase 402 may additionally comprise associating a payment credential (such as a PAN) with the biometric vector (second vector $\vec{b}$) stored at the payment processing server (second computer). In this example, enrollment phase 402 may additionally comprise the user or consumer filling out a web form with information such as the user's PAN, which may then be encrypted and transmitted to the second computer so that it can be stored in association with the second vector $\vec{b}$.

However, as stated above, in some embodiments, enrollment phase 402 may be optional. This may occur in embodiments where the first computer and the second computer do not need to receive the first vector $\vec{a}$ and second vector $\vec{b}$ respectively from an external source (e.g., via a biometric capture). For example, the first vector $\vec{a}$ may represent the location of a user, determined from the GPS of the user's smart phone, and the second vector $\vec{b}$ may represent the location of a business, such as a café that the user is trying to navigate to. As such, the first computer may comprise the user's smart phone, and the second computer may comprise a server computer associated with a navigation or mapping service. The scalar product of the two vectors may be used by the user's smart phone in order to help the user navigate to the café. Because the user's location vector can be inferred from GPS data, and because the navigation service may already know the location of the café, there may be no need to perform enrollment phase 402.

Figure 5:
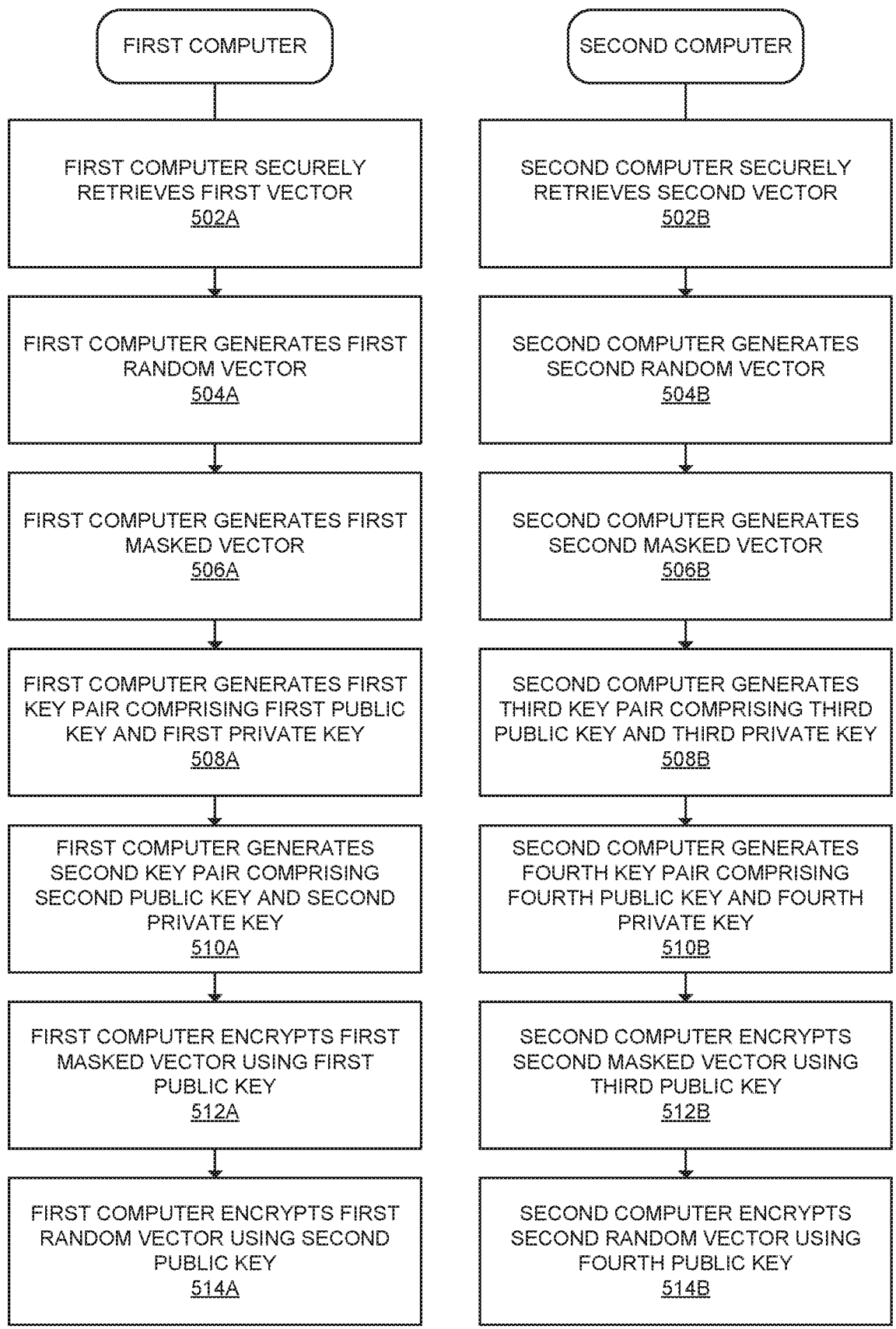
FIG. 5 shows a flowchart of a setup phase, part of a method of calculating the scalar product of two vectors according to some embodiments.

Setup phase 404 may be better understood with reference to FIG. 5. In general, the setup phase may comprise steps that may take place before any data is transmitted between the first computer and the second computer.

FIG. 5 shows a flowchart of the steps performed during the setup phase of a method according to embodiments. It may be helpful to note that the subscript A generally refers to vectors or values generated or used by the first computer, while the subscript B generally refers to vectors, values, or cryptographic keys generated or used by the second computer.

At step 502A, the first computer can securely retrieve the first vector $\vec{a}$. In some embodiments, the first computer may be a smart phone associated with a user. In these embodiments, the first computer may securely retrieve the first vector $\vec{a}$ from a secure element of the first computer (using for example, contactless element interface 220 from FIG. 2).

Likewise, at step 502B, the second computer can securely retrieve the second vector $\vec{b}$. In some embodiments, the second computer may be a remote server computer associated with some form of authenticating entity (e.g., a government agency or a payment processing server associated with a payment processing network). The second computer may securely retrieve the second vector $\vec{b}$ from a secure or encrypted database.

In some embodiments, the first vector $\vec{a}$ and the second vector $\vec{b}$ may be biometric vectors, that is, the first vector $\vec{a}$ and the second vector $\vec{b}$ may correspond to a first biometric template and a second biometric template (e.g., iris codes, digital representations of fingerprints, voice samples, DNA segments, etc.). The first vector $\vec{a}$ and the second vector $\vec{b}$ may be of equal length, that is, possess the same number of components.

At step 504A the first computer may generate a first random vector $\vec{r}_A$. The first random vector $\vec{r}_A$ may be generated according to any appropriate means, including the use of cryptographically secure pseudorandom number generators (CSPRNGs). The first random vector $\vec{r}_A$ may be of equal length to the first vector $\vec{a}$, that is, the first vector $\vec{a}$ and the first random vector $\vec{r}_A$ may possess the same number of components. For example, if the first vector $\vec{a}$ comprises a vectorized iris code comprising 256 1-byte components, the first random vector $\vec{r}_A$ may comprise 256 randomly generated bytes.

Likewise, at step 504B, the second computer may generate a second random vector $\vec{r}_B$. The second random vector $\vec{r}_B$ may similarly be generated using any appropriate means, including the use of CSPRNGs. The second random vector $\vec{r}_B$ may be of equal length to the second vector $\vec{b}$, that is, the second vector $\vec{b}$ and the second random vector $\vec{r}_B$ may possess the same number of components.

At step 506A, the first computer can generate the first masked vector $\vec{a}'$ by combining the first vector $\vec{a}$ and the first random vector $\vec{r}_A$. In some embodiments, the first masked vector $\vec{a}'$ may be equal to the sum of the first vector $\vec{a}$ and the first random vector $\vec{r}_A$:

$$\vec{a}' = \vec{a} + \vec{r}_A = [a_1 + r_{A1}, a_2 + r_{A2}, \ldots a_n + r_{An}]$$

Likewise, at step 506B, the second computer can generate the second masked vector $\vec{b}'$ by combining the second vector $\vec{b}$ and the second random vector $\vec{r}_B$. In some embodiments, the second masked vector $\vec{b}'$ may be equal to the sum of the second vector $\vec{b}$ and the second random vector $\vec{r}_B$:

$$\vec{b}' = \vec{b} + \vec{r}_B = [b_1 + r_{B1}, b_2 + r_{B2}, \ldots b_n + r_{Bn}]$$

At step 508A, the first computer can generate a first key pair comprising a first public key $Pb_A$ and a first private key $Pr_A$. The first public key $Pb_A$ may enable the use of the encryption function $E_A$, and the first private key $Pr_A$ may enable the use of the decryption function $D_A$. That is, data (e.g., vectors) encrypted with the first public key $Pb_A$ may be decrypted with the first private key $Pr_A$.

At step 510A, the first computer can generate a second key pair comprising a second public key $Pb_A'$ and a second private key $Pr_A'$. The second public key $Pb_A'$ may enable the use of the encryption function $E_A'$, and the second private key $Pr_A'$ may enable the use of the decryption function $D_A'$. That is, data (e.g., vectors) encrypted with the second public key $Pb_A'$ may decrypted with the second private key $Pr_A'$.

Likewise, at step 508B, the second computer can generate a third key pair comprising a third public key $Pb_B$ and a third private key $Pr_B$. The third public key $Pb_B$ may enable the use of the encryption function $E_B$, and the third private key $Pr_B$ may enable the use of the decryption function $D_B$. That is, data (e.g., vectors) encrypted with the third public key $Pb_B$ may be decrypted with the third private key $Pr_B$.

Similarly, at step 510B, the second computer can generate a fourth key pair comprising a fourth public key $Pb_B'$ and a fourth private key $Pr_B'$. The fourth public key $Pb_B'$ may enable the use of the encryption function $E_B'$, and the fourth private key $Pr_B'$ may enable the use of the decryption function $D_B'$. That is, data (e.g., vectors) encrypted with the fourth public key $Pb_B'$ may be decrypted with the fourth private key $Pr_B'$.

In some embodiments, the first public key $Pb_A$, the first private key $Pr_A$, the second public key $Pb_A'$, the second private key $Pr_A'$, the third public key $Pb_B$, the third private key $Pr_B$, the fourth public key $Pb_B'$, and the fourth private key $Pr_B'$ may be additive homomorphic cryptographic keys, such as Paillier cryptographic keys.

The generation of these cryptographic key pairs depends on the nature of the cryptosystem being used. The following example method of generating cryptographic key pairs corresponds to the use of the Paillier cryptosystem. First, the first computer or second computer can choose two large prime numbers p and q randomly and independently, such that the greatest common denominator of pq and (p−1)(q−1) is 1. Second, the first computer or second computer can compute n=p*q and λ=lcm(p−1, q−1), where lcm is a function used to determine the least common multiple. Third, the first computer or second computer can generate a random integer g such that $g \in \mathbb{Z}_{n^2}^*$. Fourth, the first computer or second computer can calculate $$\mu = \frac{n}{g^\lambda \bmod n^2 - 1} \bmod n.$$

The public key (used for encryption) is the pair (n, g), while the private key (used for decryption) is the pair (λ, μ). This process can be repeated based on the number of keys to be generated, e.g., the first computer can repeat this process twice to generate the first public key $Pb_A$, the first private key $Pr_A$, the second public key $Pb_A'$, and the second private key $Pr_A'$, and the second computer can repeat the process twice to generate the third public key $Pb_B$, the third private key $Pr_B$, the fourth public key $Pb_B'$, and the fourth private key $Pr_B'$.

At step 512A, the first computer can generate a first encrypted masked vector $E_A(\vec{a}')$ by encrypting the first masked vector $\vec{a}'$ using the first public key $Pb_A$.

Likewise, at step 514A, the first computer can generate a first encrypted random vector $E_A'(\vec{a}')$ by encrypting the first random vector $\vec{r}'$ using the second public key $Pb_A'$.

At step 512B, the second computer can generate a second encrypted masked vector $E_B(\vec{b}')$ by encrypting the second masked vector $\vec{b}'$ using the third public key $Pb_B$.

Likewise, at step 514B, the second computer can generate a second encrypted random vector $E_B'(\vec{r}_B)$ by encrypting the second random vector $\vec{r}_B$ using the fourth public key $Pb_B'$.

Generally, in embodiments of the present disclosure, an encrypted vector refers to a vector for which each component of the vector is encrypted. For example, for the first encrypted masked vector $E_A(\vec{a}')$:

$$E_A(\vec{a}') := (E_A(a_1'), \ldots, E_A(a_n'))$$

Returning to FIG. 4, following setup phase 404 is first transmission phase 406. In the first transmission phase 406, the first computer and the second computer can transmit data to one another. This data may be used in subsequent intermediate calculation phase 408 and scalar product calculation phase 412.

More specifically, in first transmission phase 406, the first computer may transmit to the second computer, a first public key $Pb_A$, a second public key $Pb_A'$, a first encrypted masked vector $E_A(\vec{a}')$, and a first encrypted random vector $E_A'(\vec{r}_A)$, wherein the first encrypted masked vector $E_A(\vec{a}')$ is a first masked vector $\vec{a}'$ encrypted using the first public key $Pb_A$, and the first encrypted random vector $E_A'(\vec{r}_A)$ is a first random vector $\vec{r}_A$ encrypted using the second public key $Pb_A'$.

Additionally, the first transmission phase 406 may comprise the first computer receiving, from the second computer, a third public key $Pb_B$, a fourth public key $Pb_B'$, a second encrypted masked vector $E_B(\vec{b}')$, and a second encrypted random vector $E_B'(\vec{r}_B)$, wherein the second encrypted masked vector $E_B(\vec{b}')$ is a second masked vector $\vec{b}'$ encrypted using the third public key $Pb_B$ and the second encrypted random vector is a second random vector $\vec{r}_B$ encrypted using the fourth public key $Pb_B'$.

These data (i.e., the first public key $Pb_A$, the second public key $Pb_A'$, the third public key $Pb_B$, the fourth public key $Pb_B'$, the first encrypted masked vector $E_A(\vec{a}')$, the second encrypted masked vector $E_B(\vec{b}')$, the first encrypted random vector $E_A'(\vec{r}_A)$, and the second encrypted random vector $E_B'(\vec{r}_B)$) may be transmitted over any appropriate network in any appropriate form. For example, these data may be transmitted over a network such as the Internet in data packets such as UDP or TCP packets.

Figure 6:
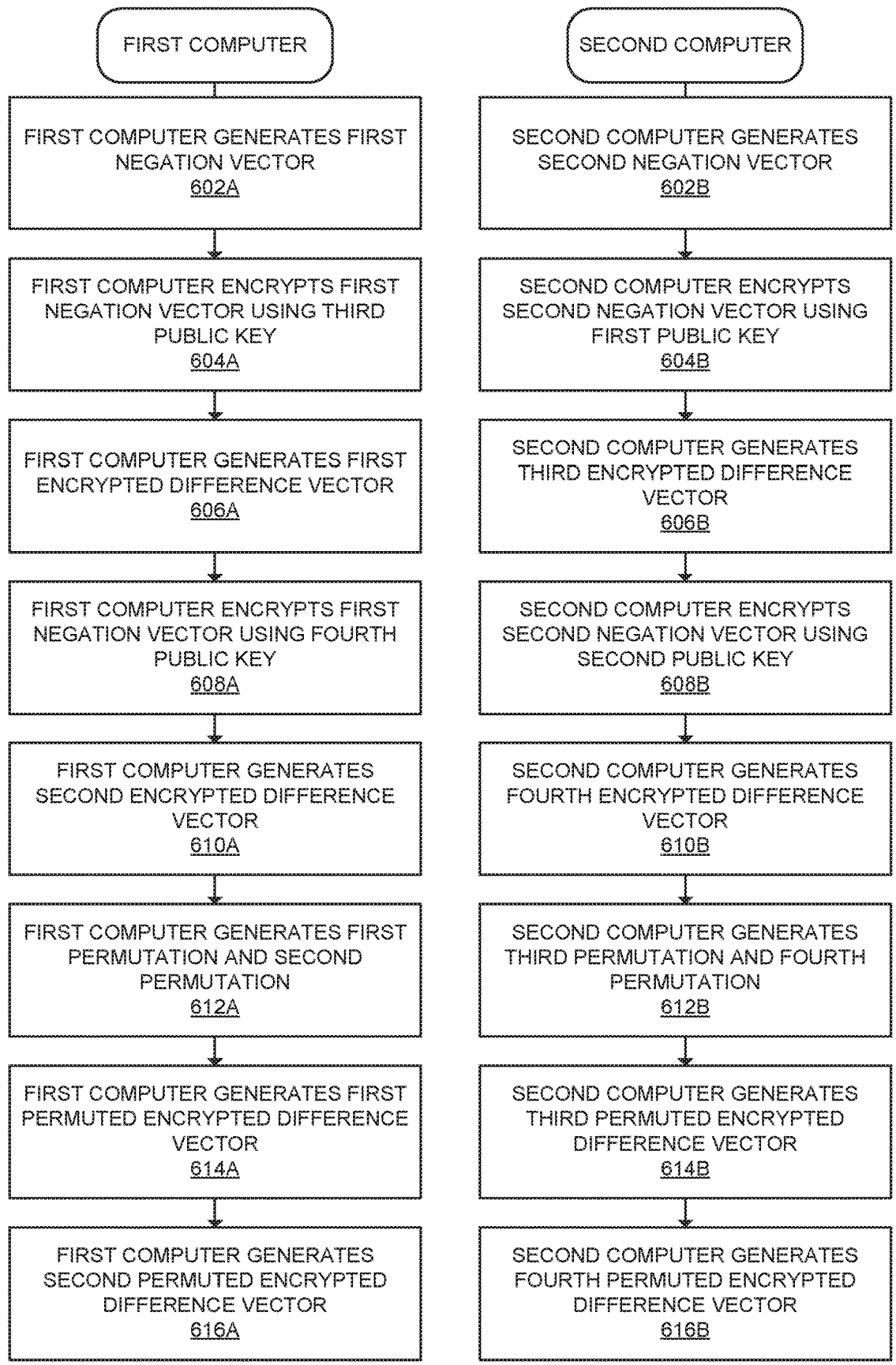
FIG. 6 shows a flowchart of an intermediate calculation phase, part of a method of calculating the scalar product of two vectors according to some embodiments.
Figure 7:
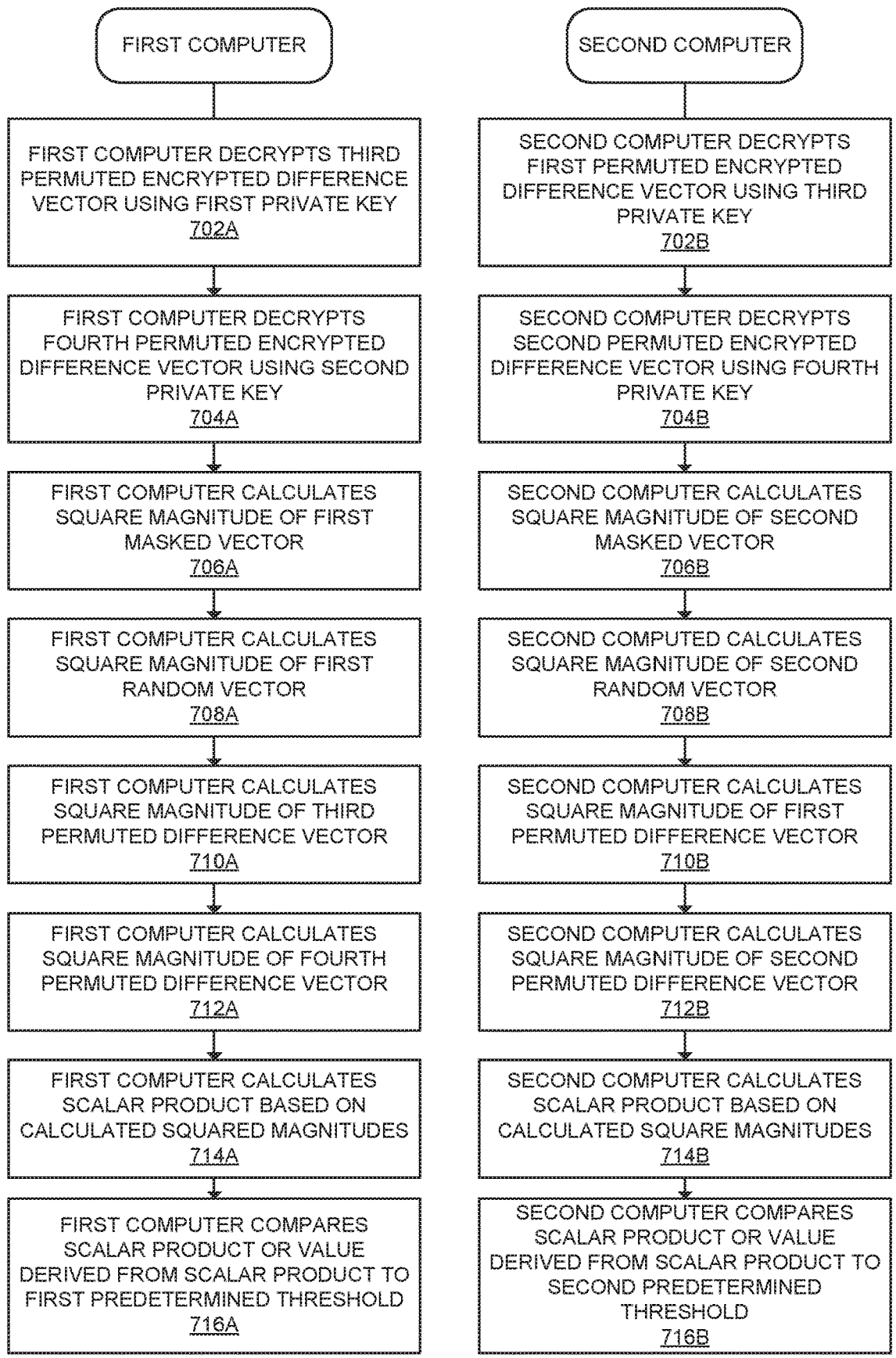
FIG. 7 shows a flowchart of a scalar product calculation phase, part of a method of calculating the scalar product of two vectors according to some embodiments.

After first transmission phase 406, the first computer and the second computer 408 can advance to intermediate calculation phase 408, which may be better understood with reference to FIG. 6

FIG. 6 shows a flowchart of the steps performed during the intermediate calculation phase of a method according to embodiments.

At step 602A, the first computer can generate a first negation vector $-\vec{a}$. The first negation vector $-\vec{a}$ may comprise the negation of the first vector $\vec{a}$, i.e., each component of the first negation vector $-\vec{a}$ may equal the negative value of the corresponding component of the first vector $\vec{a}$. For example, for a first vector $\vec{a}=[1, 2, 3]$, the first negation vector $-\vec{a}=[-1, -2, -3]$.

Likewise, at step 602B, the second computer can generate a second negation vector $-\vec{b}$. The second negation vector $-\vec{b}$ may comprise the negation of the second vector $\vec{b}$, i.e., each component of the second negation vector $-\vec{b}$ may equal the negative value of the corresponding component of the second vector $\vec{b}$. For example, for a second vector $\vec{b}=[4, 5, 6]$, the second negation vector $-\vec{b}=[-4, -5, -6]$.

At step 604A, the first computer can generate a first encrypted negation vector $E_B(-\vec{a})$ by encrypting the first negation vector $-\vec{a}$ using the third public key $Pb_B$. The third public key $Pb_B$ could have been previously generated by the second computer during the setup phase (setup phase 404 from FIG. 4) and transmitted to the first computer during the first transmission phase (first transmission phase 406 from FIG. 4).

At step 606A, the first computer can generate a first encrypted difference vector $E_B(\vec{b}'-\vec{a})$ based on the second encrypted masked vector $E_B(\vec{b}')$ and the first encrypted negation vector $E_B(-\vec{a})$. The second encrypted masked vector $E_B(\vec{b}')$ may have been received by the first computer from the second computer during the first transmission phase. In some embodiments, the first computer may make use of the properties of additive homomorphic cryptography to generate the first encrypted difference vector $E_B(\vec{b}'-\vec{a})$. This may enable the first computer to generate the first encrypted difference vector $E_B(\vec{b}'-\vec{a})$ without first decrypting the second encrypted masked vector $E_B(\vec{b}')$.

For example, in the Paillier cryptosystem, generally, the product of two ciphertexts c and d is equal to the encrypted sum of the corresponding plaintext, i.e.:

$$E(c)E(d)=E(c+d)$$

As a result, the first computer can generate the first encrypted difference vector $E_B(\vec{b}'-\vec{a})$ by multiplying each component of the second encrypted masked vector $E_B(\vec{b}')$ by the corresponding component of the first encrypted negation vector $E_B(-\vec{a})$:

$$E_B(-\vec{a})=[E_B E_B(-a_2), \ldots E_B(-a_n)]$$

$$E_B(\vec{b}')=[E_B(b_1'),E_B(b_2'), \ldots ,E_B(b_n')]$$

$$E_B(\vec{b}'-\vec{a})=[E_B(b_1')E_B(-a_1),E_B(b_2')E_B(-a_2), \ldots ,E_B(b_n')E_B(-a_n)]$$

$$E_B(\vec{b}'-\vec{a})=[E_B(b_1'-a_1),E_B(b_2'-a_2), \ldots ,E_B(b_n'-a_n)]$$

At step 608A, the first computer can generate a second encrypted negation vector $E_B'(-\vec{a})$ by encrypting the first negation vector $-\vec{a}$ using the fourth public key $Pb_B'$. The fourth public key $Pb_B'$ could have been generated by the second computer during the setup phase and transmitted to the first computer during the first transmission phase.

At step 610A, the first computer can generate a second encrypted difference vector $E_B'(\vec{r_B}-\vec{a})$ based on the second encrypted random vector $E_B'(\vec{r_B})$ and the second encrypted negation vector $E_B'(-\vec{a})$. The second encrypted random vector $E_B'(\vec{r_B})$ may have been received from the second computer during the first transmission phase. In some embodiments, the first computer may make use of the properties of additive homomorphic cryptography to generate the second encrypted difference vector $E_B'(\vec{r_B}-\vec{a})$. This may be accomplished using a similar series of steps or operations as used to generate the first encrypted difference vector at step 606A, i.e., multiplying each encrypted component of the second encrypted random vector $E_B'(\vec{r_B})$ by the corresponding component of the second encrypted negation vector $E_B'(-\vec{a})$:

$$E_B'(-\vec{a})=[E_B'(-a_1),E_B'(-a_2), \ldots ,E_B'(-a_n)]$$

$$E_B'(\vec{r_B})=[E_B'(r_{B1}),E_B'(r_{B2}), \ldots ,E_B'(r_{Bn})]$$

$$E_B'(\vec{r_B}-\vec{a})=[E_B'(r_{B1})E_B'(-a_1),E_B'(r_{B2})E_B'(-a_2), \ldots ,E_B'(r_{Bn})E_B'(-a_n)]$$

$$E_B'(\vec{r_B}-\vec{a})=[E_B'(r_{B1}-a_1),E_B'(r_{B2}-a_2), \ldots ,E_B'(r_{Bn}-a_n)]$$

At step 604B, the second computer can generate a third encrypted negation vector $E_A(-\vec{b})$ by encrypting the second negation vector $-\vec{b}$ using the first public key $Pb_A$. The first public key $Pb_A$ could have been generated by the first computer during the setup phase and transmitted to the second computer during the first transmission phase.

At step 606B, the second computer can generate a third encrypted difference vector $E_A(\vec{a}'-\vec{b})$ based on the first encrypted masked vector $E_A(\vec{a}')$ and the third encrypted negation vector $E_A(-\vec{b})$. The second computer may have received the first encrypted masked vector $E_A(\vec{a}')$ from the first computer during the first transmission phase. In some embodiments, the second computer may make use of the properties of additive homomorphic cryptography to generate the third encrypted difference vector $E_A(\vec{a}'-\vec{b})$. This may be accomplished using a similar series of steps or operations as used to generate the first encrypted difference vector at step 606A, i.e., multiplying each encrypted component of the first encrypted masked vector $E_A(\vec{a}')$ with the corresponding encrypted component of the third encrypted negation vector $E_A(-\vec{b})$.

$$E_A(-\vec{b})=[E_A(-b_1),E_A(-b_2), \ldots ,E_A(-b_n)]$$

$$E_A(\vec{a}')=[E_A(a_1'),E_A(a_2'), \ldots ,E_A(a_n')]$$

$$E_A(\vec{a}'-\vec{b})=[E_A(a_1')E_A(-b_1),E_A(a_2')E_A(-b_2), \ldots ,E_A(a_n')E_A(-b_n)]$$

$$E_A(\vec{a}'-\vec{b})=[E_A(a_1'-b_1),E_A(a_2'-b_2), \ldots ,E_A(a_n'-b_n)]$$

At step 608B, the second computer can generate a fourth encrypted negation vector $E_A'(-\vec{b})$ by encrypting the second negation vector $-\vec{b}$ using the second public key $Pb_A'$. The second public key $Pb_A'$ could have previously been generated by the first computer during the setup phase and transmitted to the second computer during the first transmission phase.

At step 610B, the second computer can generate a fourth encrypted difference vector $E_A'(\vec{r_A}-\vec{b})$ based on the first encrypted random vector $E_A'(\vec{r_A})$ and the fourth encrypted negation vector $E_A'(-\vec{b})$. The second computer may have received the first encrypted random vector from the first computer during the first transmission phase. In some embodiments, the second computer may make use of the properties of additive homomorphic cryptography to generate the fourth encrypted difference vector $E_A'(\vec{r_A}-\vec{b})$. This may be accomplished using a similar series of steps or operations used to generate the third encrypted difference vector at step 606B, i.e., multiplying each encrypted component of the second encrypted random vector $E_A'(\vec{r_A})$ by the corresponding encrypted component of the second encrypted negation vector $E_A'(-\vec{b})$:

$$E_A'(-\vec{b}) = [E_A'(-b_1), E_A'(-b_2), \ldots, E_A'(-b_n)]$$

$$E_A'(\vec{r_A}) = [E_A'(r_{A1}), E_A'(r_{A2}), \ldots, E_A'(r_{An})]$$

$$E_A'(\vec{r_A}-\vec{b}) = [E_A'(r_{A1})E_A'(-b_1), E_A'(r_{A2})E_A'(-b_2), \ldots, E_A'(r_{An})E_A'(-b_n)]$$

$$E_A'(\vec{r_A}-\vec{b}) = [E_A'(r_{A1}-b_1), E_A'(r_{A2}-b_2), \ldots, E_A'(r_{An}-b_n)]$$

At step 612A the first computer can generate a first permutation $\pi_{A1}$ and a second permutation $\pi_{A2}$. As described above, a permutation is a way in which a set or number of things can be ordered or arranged. A permutation may be used to "permute" something in accordance with the permutation, and a permutation may be represented as a vector. As an example, the permutation $\pi=[3, 1, 2]$ may indicate that, for a vector comprising three components, the third component should be placed in the first position, the first component should be placed in the second position, and the second component should be placed in the third position. For example, the permutation $\pi=[3, 1, 2]$ applied to vector $\vec{v}=[7,8,9]$ can result in a permuted vector $\pi(\vec{v})=[9,7,8]$.

The first computer can generate the first permutation $\pi_{A1}$ and second permutation $\pi_{A2}$ in any number of ways. As an example, the first computer may use an algorithm (such as the Fisher-Yates shuffle) to shuffle an ordered sequence (i.e., [1, 2, . . . , n]). The shuffled ordered sequence may be used as the first permutation $\pi_{A1}$. The first computer can use a similar process to generate the second permutation, shuffling an ordered sequence a second time and using the result as the second permutation $\pi_{A2}$. The first permutation $\pi_{A1}$ and second permutation $\pi_{A2}$ may have the same number of components as the first vector $\vec{a}$.

At step 612B, the second computer can generate a third permutation $\pi_{B1}$ and a fourth permutation $\pi_{B2}$. As described above with reference to the first permutation $\pi_{A1}$ and the second permutation $\pi_{A2}$, the third permutation $\pi_{B1}$ and the fourth permutation $\pi_{B2}$ can be generated in any number of ways, e.g., shuffling an ordered sequence using a shuffling algorithm, e.g., Fisher-Yates.

At step 614A, the first computer can generate a first permuted encrypted difference vector $\pi_{A1}(E_B(\vec{b'}-\vec{a}))$ using the first permutation $\pi_{A1}$ and the first encrypted difference vector $E_B(\vec{b'}-\vec{a})$. The first computer may generate the first permuted encrypted difference vector $\pi_{A1}(E_B(\vec{b'}-\vec{a}))$ by permuting the first encrypted difference vector $E_B(\vec{b'}-\vec{a})$ using the first permutation $\pi_{A1}$, i.e., applying the first permutation $\pi_{A1}$ to the first encrypted difference vector $E_B(\vec{b'}-\vec{a})$. This may be accomplished by using the values or components of the first permutation $\pi_{A1}$ as indices to reorder the first encrypted difference vector $E_B(\vec{b'}-\vec{a})$. To repeat the example used above, the permutation $\pi=[3,1,2]$ applied to vector $\vec{v}=[7, 8, 9]$ can result in a permuted vector $\pi(\vec{v})=[9, 7, 8]$. In a similar manner, the first permutation $\pi_{A1}$ applied to the first encrypted difference vector $E_B(\vec{b'}-\vec{a})$ can result in the first permuted encrypted difference vector $\pi_{A1}(E_B(\vec{b'}-\vec{a}))$.

At step 616A, the first computer can generate a second permuted encrypted difference vector $\pi_{A2}(E_B'(\vec{r_B}-\vec{a}))$ using the second permutation $\pi_{A2}$ and the second encrypted difference vector $E_B'(\vec{r_B}-\vec{a})$. This may be accomplished in substantially the same manner as described above with reference to step 614A, i.e., the first computer can use the second permutation $\pi_{A2}$ to reorder the components of the second encrypted difference vector $E_B'(\vec{r_B}-\vec{a})$, producing the second permuted encrypted difference vector $\pi_{A2}(E_B'(\vec{r_B}-\vec{a}))$.

At step 614B, the second computer can generate a third permuted encrypted difference vector $\pi_{B1}(E_A(\vec{a'}-\vec{b}))$ using the third permutation $\pi_{B1}$ and the third encrypted difference vector $E_A(\vec{a'}-\vec{b})$. This may be accomplished in substantially the same manner as described above with reference to steps 614A and 616A, i.e., the second computer can use the third permutation $\pi_{B1}$ to reorder the components of the third encrypted difference vector $E_A(\vec{a'}-\vec{b})$ to produce the third permuted encrypted difference vector $\pi_{B1}(E_A(\vec{a'}-\vec{b}))$.

At step 616B, the second computer can generate a fourth permuted encrypted difference vector $\pi_{B2}(E_A'(\vec{r_A}-\vec{b}))$ using the fourth permutation $\pi_{B2}$ and the fourth encrypted difference vector $E_A'(\vec{r_A}-\vec{b})$. This may be accomplished in substantially the same manner as described above with reference to steps 614A, 614B, and 616A, i.e., the second computer can use the fourth permutation $\pi_{B2}$ to reorder the components of the fourth encrypted difference vector $E_A'(\vec{r_A}-\vec{b})$ to produce the fourth permuted encrypted difference vector $\pi_{B2}(E_A'(\vec{r_A}-\vec{b}))$.

It should be understood that in some embodiments, some steps performed during the intermediate calculation phase may instead be performed at an earlier or later phase. As an example, the first permutation $\pi_{A1}$, second permutation $\pi_{A2}$, third permutation $\pi_{B1}$ and fourth permutation $\pi_{B2}$ may be generated during the setup phase (setup phase 404 from FIG.

4). Likewise, the first negation vector $-\vec{a}$, and the second negation vector $-\vec{b}$ may also be generated during the setup phase, rather than during the intermediate calculation phase as described.

Returning to FIG. 4, following intermediate calculation phase 408, the first computer and the second computer may perform second transmission phase 410. In second transmission phase 410, the first computer and the second computer may transmit data generated during intermediate calculation phase 408 to one another. These data may be used to calculate the scalar product $\vec{a} \cdot \vec{b}$ in scalar product calculation phase 412, as described below.

More specifically, in second transmission phase 410, the first computer may transmit, to the second computer, the first permuted encrypted difference vector $\pi_{A1}(E_B(\vec{b'}-\vec{a}))$ and the second permuted encrypted difference vector $\pi_{A2}(E_B'(\vec{r_B}-\vec{a}))$ Likewise, in second transmission phase 410, the first computer may receive, from the second computer, a third permuted encrypted difference vector $\pi_{B1}(E_A(\vec{a'}-\vec{b}))$ and a fourth permuted encrypted difference vector $\pi_{B2}(E_A'(\vec{r_A}-\vec{b}))$, wherein the third permuted encrypted difference vector $\pi_{B1}(E_A(\vec{a'}-\vec{b}))$ is encrypted using the first public key $Pb_A$ and permuted using a third permutation $\pi_{B1}$, and wherein the fourth permuted encrypted difference vector $\pi_{B2}(E_A'(\vec{r_A}-\vec{b}))$ is encrypted using the second public key $Pb_A'$ and permuted using a fourth permutation $\pi_{B2}$.

As in first transmission phase 406, these data (i.e., the first permuted encrypted difference vector $\pi_{A1}(E_B(\vec{b'}-\vec{a}))$, the second permuted encrypted difference vector $\pi_{A2}(E_B'(\vec{r_B}-\vec{a}))$, the third permuted encrypted difference vector $\pi_{B1}(E_A(\vec{a'}-\vec{b}))$ and the fourth permuted encrypted difference vector $\pi_{B2}(E_A'(\vec{r_A}-\vec{b}))$ may be transmitted over any appropriate network in any appropriate form. For example, these data may be transmitted over a network such as the Internet in data packets such as UDP or TCP packets.

Following second transmission phase 410, the first computer and the second computer may proceed to scalar product calculation phase 412, in which the first computer and the second computer calculate the scalar product of the first vector $\vec{a}$ and the second vector $\vec{b}$. Scalar product calculation phase 412 may be better understood with reference to FIG. 7.

At step 702A, the first computer can produce a third permuted difference vector $\vec{d_A}:=\pi_{B1}(\vec{a'}-\vec{b})$ by decrypting the third permuted encrypted difference vector $\pi_{B1}(E_A(\vec{a'}-\vec{b}))$ using the first private key $Pr_A$. Although the first computer knows the value of the components of the first masked vector $\vec{a'}$, because the third permutation $\pi_{B1}$ is unknown to the first computer, the first computer cannot determine the value of the components of the second vector $\vec{b}$. Thus, the second vector $\vec{b}$ is protected from the first computer. This may maintain the privacy of a person corresponding to the second vector $\vec{b}$ (e.g., if the second vector $\vec{b}$ is a biometric vector corresponding to the person).

At step 702B, the second computer can produce a first permuted difference vector $\vec{d_B}:=\pi_{A1}(\vec{b'}-\vec{a})$ by decrypting the first permuted encrypted difference vector $\pi_{A1}(E_B(\vec{b'}-\vec{a}))$ using the third private key $Pr_B$. Although the second computer knows the value of the components of the second masked vector $\vec{b'}$, because the first permutation $\pi_{A1}$ is unknown to the second computer, the second computer cannot determine the value of the components of the first vector $\vec{a}$. Thus the first vector $\vec{a}$ is protected from the second computer. This may maintain the privacy of a person corresponding to the first vector $\vec{a}$ (e.g., if the first vector $\vec{a}$ is a biometric vector corresponding to the person).

At step 704A, the first computer can produce a fourth permuted difference vector $\vec{s_A}:=\pi_{B2}(\vec{r_A}-\vec{b})$ by decrypting the fourth permuted encrypted difference vector $\pi_{B2}(E_A'(\vec{r_A}-\vec{b}))$ using the second private key $Pr_A'$. Again, the second vector $\vec{b}$ is protected from the first computer, because although the first computer knows the value of the components of the first random vector $\vec{r_A}$, the first computer does not know the fourth permutation $\pi_{B2}$.

At step 704B, the second computer can produce a second permuted difference vector $\vec{s_B}:=\pi_{A2}(\vec{r_B}-\vec{a})$ by decrypting the second permuted encrypted difference vector $\pi_{A2}(E_B'(\vec{r_B}-\vec{a}))$ using the fourth private key $Pr_B'$. Again, the first vector $\vec{a}$ is protected from the second computer, because although the second computer knows the value of the components of the second random vector $\vec{r_B}$, the second computer does not know the second permutation $\pi_{A2}$.

At step 706A, the first computer can calculate a square magnitude of the first masked vector $\alpha'$. The value of the square magnitude of the first masked vector $\alpha'$ is equal to the scalar product of the first masked vector $\vec{a'}$ with itself, i.e.:

$$\alpha'=\vec{a'} \cdot \vec{a'}$$

The first computer may square the value of each component of the first masked vector $\vec{a'}$, then sum the resulting squares, i.e., the first computer may calculate the square magnitude of the first masked vector $\alpha'$ according to the following formula:

$$\alpha'=\Sigma_{i=1}^n a_i'^2$$

Likewise, at step 706B, the second computer can calculate the square magnitude of the second masked vector $\beta'$. The value of the square magnitude of the second masked vector $\beta'$ is equal to the scalar product of the second masked vector $\vec{b'}$ with itself, i.e.:

$$\beta'=\vec{b'} \cdot \vec{b'}$$

The second computer may square the value of each component of the second masked vector $\vec{b'}$, then sum the resulting squares, i.e., the second computer may calculate the square magnitude of the second masked vector $\beta'$ according to the following formula:

$$\beta'=\Sigma_{i=1}^n b_i'^2$$

At step 708A, the first computer can calculate a square magnitude of the first random vector $\rho_A$. The value of the square magnitude of the first random vector $\rho_A$ is equal to the scalar product of the first random vector $\vec{r_A}$ with itself, i.e.:

$$\rho_A=\vec{r_A} \cdot \vec{r_A}$$

The first computer may square the value of each component of the first random vector $\vec{r}_A$, then sum the resulting squares, i.e., the first computer may calculate the square magnitude of the first random vector $\rho_A$ according to the following formula:

$$\rho_A = \Sigma_{i=1}^n r_{Ai}^2$$

Likewise, at step 708B, the second computer can calculate the square magnitude of the second random vector $\rho_B$. The value of the square magnitude of the second random vector $\rho$ is equal to the scalar product of the second random vector $\vec{r}_B$ with itself, i.e.:

$$\rho_B = \vec{r}_B \cdot \vec{r}_B$$

The second computer may square the value of each component of the second random vector $\vec{r}_B$, then sum the resulting squares, i.e., the second computer may calculate the square magnitude of the second random vector $\rho_B$ according to the following formula:

$$\rho_B = \Sigma_{i=1}^n r_{Bi}^2$$

At step 710A, the first computer can calculate the square magnitude of the third permuted difference vector $\delta_A$. The value of the square magnitude of the third permuted difference vector $\delta_A$ is equal to the scalar product of the third permuted difference vector $\vec{d}_A := \pi_{B1}(\vec{a}' - \vec{b})$ with itself, i.e.:

$$\delta_A = \vec{d}_A \cdot \vec{d}_A$$

The first computer may square the value of each component of the third permuted difference vector $\vec{d}_A := \pi_{B1}(\vec{a}' - \vec{b})$, then sum the resulting squares, i.e., the first computer may calculate the square magnitude of the third permuted difference vector $\delta_A$ according to the following formula:

$$\delta_A = \Sigma_{i=1}^n d_{Ai}^2$$

Likewise, at step 710B, the second computer can calculate the square magnitude of the first permuted difference vector $\delta_B$. The value of the square magnitude of the first permuted difference vector $\delta_B$ is equal to the scalar product of the first permuted difference vector $\vec{d}_B := \pi_{A1}(\vec{b}' - \vec{a})$ with itself, i.e.:

$$\delta_B = \vec{d}_B \cdot \vec{d}_B$$

The second computer may square the value of each component of the first permuted difference vector $\vec{d}_B := \pi_{A1}(\vec{b}' - \vec{a})$, then sum the resulting squares, i.e., the second computer may calculate the square magnitude of the first permuted difference vector $\delta_B$ according to the following formula:

$$\delta_B = \Sigma_{i=1}^n d_{Bi}^2$$

At step 712A, the first computer can calculate the square magnitude of the fourth permuted difference vector $\sigma_A$. The value of the square magnitude of the fourth permuted difference vector $\sigma_A$ is equal to the scalar product of the fourth permuted difference vector $\vec{s}_A := \pi_{B2}(\vec{r}_A - \vec{b})$ with itself, i.e.:

$$\sigma_A = \vec{s}_A \cdot \vec{s}_A$$

The first computer may square the value of each component of the fourth permuted difference vector $\vec{s}_A := \pi_{B2}(\vec{r}_A - \vec{b})$, then sum the resulting squares, i.e., the first computer may calculate the square magnitude of the fourth permuted difference vector $\sigma_A$ according to the following formula:

$$\sigma_A = \Sigma_{i=1}^n s_{Ai}^2$$

Likewise, at step 712B, the second computer can calculate the square magnitude of the second permuted difference vector $\sigma_B$. The value of the square magnitude of the second permuted difference vector $\sigma_B$ is equal to the scalar product of the second permuted difference vector $\vec{s}_B := \pi_{A2}(\vec{r}_B - \vec{a})$ with itself, i.e.:

$$\sigma_B = \vec{s}_B \cdot \vec{s}_B$$

The second computer may square the value of each component of the second permuted difference vector $\vec{s}_B := \pi_{A2}(\vec{r}_B - \vec{a})$, then sum the resulting squares, i.e., the second computer may calculate the square magnitude of the fourth permuted difference vector $\sigma_B$ according to the following formula:

$$\sigma_B = \Sigma_{i=1}^n s_{Bi}^2$$

At step 714A, the first computer may calculate the scalar product of the first vector $\vec{a}$ and the second vector $\vec{b}$ based on the square magnitude of the first masked vector $\alpha'$, the square magnitude of the first random vector $\rho_A$, the square magnitude of the third permuted difference vector $\delta_A$, and the square magnitude of the fourth permuted difference vector $\sigma_A$. In some embodiments, the first computer may calculate the scalar product of the first vector $\vec{a}$ and the second vector $\vec{b}$ based on the following formula:

$$\vec{a} \cdot \vec{b} = \tfrac{1}{2}(\alpha' - \rho_A - \delta_A + \sigma_A)$$

Likewise, at step 714B, the second computer may calculate the scalar product of the first vector $\vec{a}$ and the second vector $\vec{b}$ based on the square magnitude of the second masked vector $\vec{\beta}'$, the square magnitude of the second random vector $\rho_B$, the square magnitude of the first permuted vector $\delta_B$, and the square magnitude of the second permuted vector $\sigma_B$. In some embodiments, the second computer may calculate the scalar product of the first vector $\vec{a}$ and the second vector $\vec{b}$ based on the following formula:

$$\vec{a} \cdot \vec{b} = \tfrac{1}{2}(\beta' - \rho_B - \delta_B + \sigma_B)$$

As a brief aside, it may be helpful to show that the methods used by the first computer and the second computer to calculate the scalar product of the first vector $\vec{a}$ and the second vector $\vec{b}$ accurately calculate the scalar product as described above.

Recall that by definition, the scalar product of two vectors is equal to the sum of the product of the components of each vector:

$$\vec{a} \cdot \vec{b} := \Sigma_{i=1}^n a_i b_i$$

As stated above, the first computer calculates the scalar product of the first vector $\vec{a}$ and the second vector $\vec{b}$ using the square magnitude of the first masked vector $\alpha'$, the square magnitude of the first random vector $\rho_A$, the square magnitude of the third permuted vector $\delta_A$ and the square magnitude of the fourth permuted vector $\sigma_A$ according to the following formula:

$$\vec{a} \cdot \vec{b} = \tfrac{1}{2}(\alpha' - \rho_A - \delta_A + \sigma_A)$$

As a reminder, the square magnitude of a given vector $\vec{c}$ is defined as the sum of the components of the vector $\vec{c}$ squared:

$$\vec{c}:=\Sigma_{i=1}^{n}c_i^2$$

As defined above, the third permuted difference vector $\vec{d}_A=\pi_{B1}(\vec{a}'-\vec{b})$. The square magnitude of the third permuted difference vector $\delta_A$ can be expressed as follows:

$$\delta_A=\Sigma_{i=1}^{n}\pi_{B1}(a_i'-b_i)^2$$

Because of the commutative property of addition, the sum is independent of the permutation, hence:

$$\delta_A=\Sigma_{i=1}^{n}(a_i'-b_i)^2$$

$$\delta_A=\Sigma_{i=1}^{n}(a_i'^2-2a_i'b_i+b_i^2)$$

$$\delta_A=\Sigma_{i=1}^{n}a_i'^2-2\Sigma_{i=1}^{n}a_i'b_i+\Sigma_{i=1}^{n}b_i^2$$

By the definition of the scalar product and the square magnitude of the first masked vector $\alpha'$, the square magnitude of the third permuted difference vector $\delta_A$ can be further expressed as:

$$\delta_A=\alpha'-2(\vec{a}'\cdot\vec{b})+\vec{b}\cdot\vec{b}$$

Using a similar line of reasoning, the fourth permuted difference vector $\sigma_A$ can be expressed as follows:

$$\sigma_A:=\Sigma_{i=1}^{n}s_{Ai}^2$$

$$\vec{s}_A:=\pi_{B2}(\vec{r}_A-\vec{b})$$

$$\sigma_A=\Sigma_{i=1}^{n}\pi_{B2}(r_{Ai}-b_i)^2$$

$$\sigma_A=\Sigma_{i=1}^{n}(r_{Ai}-b_i)^2$$

$$\sigma_A=\Sigma_{i=1}^{n}(r_{Ai}^2-2r_{Ai}b_i+b_i^2)$$

$$\sigma_A=\Sigma_{i=1}^{n}r_{Ai}^2-2\Sigma_{i=1}^{n}r_{Ai}b_i+\Sigma_{i=1}^{n}b_i^2$$

$$\sigma_A=\rho_A-2(\vec{r}_A\cdot\vec{b})+\vec{b}\cdot\vec{b}$$

Returning to the expression for the scalar product and substituting the expressions for the square magnitude of the third permuted difference vector $\delta_A$ and the square magnitude of the fourth permuted difference vector $\sigma_A$:

$$\vec{a}\cdot\vec{b}=\tfrac{1}{2}(\alpha'-\rho_A-\delta_A+\sigma_A)$$

$$\vec{a}\cdot\vec{b}=\tfrac{1}{2}(\alpha'-\rho_A-(\alpha'-2(\vec{a}'\cdot\vec{b})+\vec{b}\cdot\vec{b})+(\rho_A-2(\vec{r}_A\cdot\vec{b})+\vec{b}\cdot\vec{b}))$$

Grouping alike terms:

$$\vec{a}\cdot\vec{b}=\tfrac{1}{2}(2(\vec{a}'\cdot\vec{b}-\vec{r}_A\cdot\vec{b})+(\alpha'-\alpha')+(\rho_A-\rho_A)+(\vec{b}\cdot\vec{b}-\vec{b}\cdot\vec{b}))$$

$$\vec{a}\cdot\vec{b}=\vec{a}'\cdot\vec{b}-\vec{r}_A\cdot\vec{b}$$

Recall that the first masked vector $\vec{a}'$ is equal to the sum of the first vector $\vec{a}$ and the first random vector $\vec{r}_A$:

$$\vec{a}':=\vec{a}+\vec{r}_A$$

The expression for the scalar product can be simplified as follows:

$$\vec{a}\cdot\vec{b}=(\vec{a}+\vec{r}_A)\cdot\vec{b}-\vec{r}_A\cdot\vec{b}$$

$$\vec{a}\cdot\vec{b}=\vec{a}\cdot\vec{b}+(\vec{r}_A\cdot\vec{b}-\vec{r}_A\cdot\vec{b})$$

$$\vec{a}\cdot\vec{b}=\vec{a}\cdot\vec{b}$$

This demonstrates the accuracy of the formula used by the first computer to calculate the scalar product of the first vector $\vec{a}$ and the second vector $\vec{b}$.

Similarly, the second computer calculates the scalar product of the first vector $\vec{a}$ and the second vector $\vec{b}$ using the square magnitude of the second masked vector $\beta'$, the square magnitude of the second random vector $\rho_B$, the square magnitude of the first permuted difference vector $\delta_B$ and the square magnitude of the second permuted difference vector $\sigma_B$ according to the following formula:

$$\vec{a}\cdot\vec{b}=\tfrac{1}{2}(\beta'-\rho_B-\delta_B+\sigma_B)$$

Using a similar line of reasoning, an expression for the square magnitude of the first permuted difference vector $\delta_B$ can be determined:

$$\delta_B:=\Sigma_{i=1}^{n}d_{Bi}^2$$

$$\vec{d}_B:=\pi_{A1}(\vec{a}'-\vec{b})$$

$$\delta_B=\Sigma_{i=1}^{n}\pi_{A1}(b_i'-a_i)^2$$

$$\delta_B=\Sigma_{i=1}^{n}(b_i'-a_i)^2$$

$$\delta_B=\Sigma_{i=1}^{n}(b_i'^2-2b_i'a_i+a_i^2)$$

$$\delta_B=\Sigma_{i=1}^{n}b_i'^2-2\Sigma_{i=1}^{n}b_i'a_i+\Sigma_{i=1}^{n}a_i^2$$

$$\delta_B=\beta'-2(\vec{b}'\cdot\vec{a})+\vec{a}\cdot\vec{a}$$

Likewise, an expression for the square magnitude of the second permuted difference vector $\sigma_B$ can be determined:

$$\sigma_B:=\Sigma_{i=1}^{n}s_{Bi}^2$$

$$\vec{s}_B:=\pi_{A2}(\vec{r}_B-\vec{a})$$

$$\sigma_B=\Sigma_{i=1}^{n}\pi_{A2}(r_{Bi}-a_i)^2$$

$$\sigma_B=\Sigma_{i=1}^{n}(r_{Bi}-a_i)^2$$

$$\sigma_B=\Sigma_{i=1}^{n}(r_{Bi}^2-2r_{Bi}a_i+a_i^2)$$

$$\sigma_B=\Sigma_{i=1}^{n}r_{Bi}^2-2\Sigma_{i=1}^{n}r_{Bi}a_i+\Sigma_{i=1}^{n}a_i^2$$

$$\sigma_B=\rho_B-2(\vec{r}_B\cdot\vec{a})+\vec{a}\cdot\vec{a}$$

Returning to the expression for the scalar product and substituting expressions for the square magnitude of the first permuted difference vector $\delta_3$ and the square magnitude of the second permuted difference vector $\sigma_B$:

$$\vec{a}\cdot\vec{b}=\tfrac{1}{2}(\beta'-\rho_B-\delta_B+\sigma_B)$$

$$\vec{a}\cdot\vec{b}=\tfrac{1}{2}(\beta'-\rho_B-(\beta'-2(\vec{b}'\cdot\vec{a})+\vec{a}\cdot\vec{a})+(\rho_B-2(\vec{r}_B\cdot\vec{a})+\vec{a}\cdot\vec{a}))$$

Grouping alike terms:

$$\vec{a}\cdot\vec{b}=\tfrac{1}{2}(2(\vec{b}'\cdot\vec{a}-\vec{r}_B\cdot\vec{a})+(\beta'-\beta')+(\rho_B-\rho_B)+(\vec{a}\cdot\vec{a}-\vec{a}\cdot\vec{a}))$$

$$\vec{a}\cdot\vec{b}=\vec{b}'\cdot\vec{a}-\vec{r}_B\cdot\vec{a}$$

The second masked vector $\vec{b'}$ is equal to the sum of the second vector $\vec{b}$ and the second random vector $\vec{r_B}$:

$$\vec{b'} := \vec{b} + \vec{r_B};$$

The expression for the scalar product can be simplified as follows:

$$\vec{a} \cdot \vec{b} = (\vec{b} + \vec{r_B}) \cdot \vec{a} - \vec{r_B} \cdot \vec{a}$$

$$\vec{a} \cdot \vec{b} = \vec{b} \cdot \vec{a} + (\vec{r_B} \cdot \vec{a} - \vec{r_B} \cdot \vec{a})$$

$$\vec{a} \cdot \vec{b} = \vec{b} \cdot \vec{a}$$

This demonstrates that the equation used by the second computer the calculate the scalar product of the first vector $\vec{a}$ and the second vector $\vec{b}$ is accurate.

Returning to FIG. 7, at step 716A, the first computer can compare the scalar product or a value derived from the scalar product to a first predetermined threshold $T_A$ and if the scalar product or the value derived from the scalar product exceeds the first predetermined threshold (i.e., $\frac{1}{2}(\alpha' - \rho_A - \delta_A + \sigma_A) > T_A$), the first computer may perform an interaction with the second computer (i.e., during interaction phase 414 of FIG. 4), such as a payment transaction or gaining entry into a secure building for a user or owner of the first computer. Examples of values that could be derived from scalar products include the angle between the first vector $\vec{a}$ and the second vector $\vec{b}$, or the cosine of the angle between the first vector $\vec{a}$ and the second vector $\vec{b}$, or another trigonometric function of the angle between the first vector $\vec{a}$ and the second vector $\vec{b}$, or some other value, such as a match score, distance metric, etc.

As an example, if the match criteria is that the angle between the first vector $\vec{a}$ and the second vector $\vec{b}$ is 5 degrees or less, and the value derived from the scalar product is the cosine of the angle between the first vector $\vec{a}$ and the second vector $\vec{b}$, the first predetermined threshold $T_A$ could equal $\cos(5°) = 0.996$. If the value derived from the scalar product is greater than the first predetermined threshold $T_A$, it indicates that the angular difference between the first vector $\vec{a}$ and second vector $\vec{b}$ is 5 degrees or less, potentially indicating a match.

In some embodiments, the first vector $\vec{a}$ and the second vector $\vec{b}$ can correspond to a first biometric template and a second biometric template respectively, and the first predetermined threshold $T_A$ may be a biometric match threshold.

At step 716B, the second computer can compare the scalar product or a value derived from the scalar product (e.g., an angle between the first vector $\vec{a}$ and the second vector $\vec{b}$, or a trigonometric function of the angle between the first vector $\vec{a}$ and the second vector $\vec{b}$) to a second predetermined threshold $T_B$, and if the scalar product or the value derived from the scalar product exceeds the second predetermined threshold (i.e., $\frac{1}{2}(\beta' - \rho_B - \delta_B + \sigma_B) > T_B$), the second computer can perform an interaction with the first computer (i.e., during interaction phase 414 from FIG. 4), such as performing a payment transaction or allowing a user of the first computer access to a secure building.

In some embodiments, the first predetermined threshold $T_A$ and the second predetermined threshold $T_B$ may be unequal, indicating that either the first computer or the second computer may have a higher threshold for performing an interaction. However, in other embodiments it may be advantageous for the first predetermined threshold $T_A$ and the second predetermined threshold $T_B$ to be equal.

In some embodiments, after comparing the scalar product or a value derived from the scalar product to the first predetermined threshold $T_A$, the first computer may transmit an indication message to the second computer, indicating that the first computer is satisfied with the comparison and will proceed with an interaction. Likewise, after comparing the scalar product or a value derived from the scalar product to the second predetermined threshold $T_B$, the second computer may transmit an indication message to the first computer, indicating that the second computer is satisfied with the comparison and will proceed with an interaction. Alternatively or additionally, each of the first and/or second computer can include an indicator (e.g., on a display) when an appropriate match is determined (e.g., a green light) or is not determined (e.g., a red light).

An advantage of both computers comparing the scalar product to their respective thresholds is that both computers can confirm that the scalar exceeds their respective thresholds. If, for example, only the first computer compared the scalar product to its respective threshold, the second computer has to trust that the first computer calculated the scalar product correctly and that the first computer honestly indicated that the scalar product exceeded the first predetermined threshold. However, because both computers calculate the scalar product and compare the scalar product or a value derived from the scalar product to their respective threshold, each computer can confirm the calculation and neither computer can cheat the other.

Returning to FIG. 4, following scalar product calculation phase 412, the first computer and the second computer may perform an interaction in interaction phase 414. The interaction may be performed if the scalar product, or a value derived from the scalar product (e.g., an angle, a heuristic estimate of the angle, a cosine of an angle, a heuristic estimate of the cosine of an angle, another distance metric, etc.) exceeds a predetermined threshold, as described with reference to FIG. 7.

The interaction of interaction phase 414 may take many forms. FIG. 8 shows a block diagram of a first exemplary interaction, a payment transaction. FIG. 9 shows a block diagram of a second exemplary interaction, a building access sequence.

Figure 8:
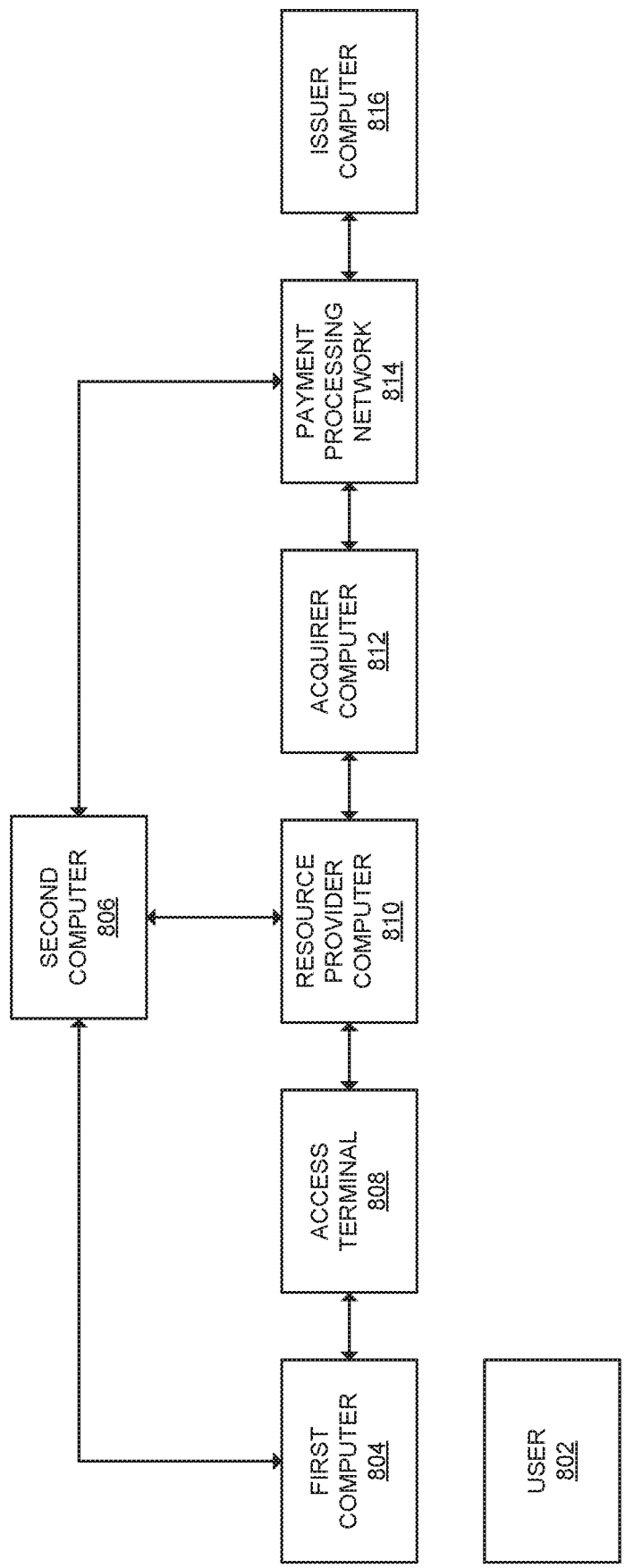
FIG. 8 shows a first exemplary interaction, comprising a payment transaction between a user of a first computer and a resource provider.

FIG. 8 shows an exemplary transaction processing system. This transaction processing system may be used as part of a first exemplary interaction between first computer 804 and second computer 806.

User 802 may be a customer operating first computer 804 (e.g., a smart phone). User 802 may wish to purchase a good or service from a resource provider (e.g., a merchant, operating resource provider computer 810). The resource provider may additionally operate an access terminal 808 (e.g., a point of sale terminal). The resource provider computer 810 may communicate with an issuer computer 816 via an acquirer computer 812 and a payment processing network 814.

The payment processing network 814 may include data processing subsystems, networks, and operations used to support and deliver authorization services, exception file services, and clearing and settlement services. An exemplary payment processing network 814 may include VisaNet™. Payment processing networks such as VisaNet™ are able to process credit card transactions, debit card transactions, and other types of commercial transactions. VisaNet™, in particular, includes a VIP system (Visa Integrated Payments system) that processes authorization requests and a BASE II system which performs clearing and settlement services. The payment processing network may use an suitable wired or wireless network, including the Internet.

An exemplary payment transaction using a biometric vector based privacy-preserving scalar product calculation can be described as follows. The user 802 may bring the first computer 804 into contact with access terminal 808 such that first computer 804 and access terminal 808 can communicate, via for example, near field communication. The first computer 804 can communicate to access terminal 808 that the user 802 wishes to pay for goods or services. The access terminal 808 may request a credential, such as an access token that can be used to enact a payment between a payment account associated with the user 802, managed by an issuer and a payment account associated with the resource provider, managed by an acquirer.

To acquire the access token, the first computer 804 and the second computer 806 may perform a privacy preserving scalar product calculation, in order to calculate the scalar product of the first biometric vector, stored on the first computer 804, and a second biometric vector, stored in a biometric vector database on the second computer 806. The first computer 804 and second computer 806 may perform the scalar product calculation as described above with reference to FIGS. 4-7. Upon calculating the scalar product, the second computer 806 may compare the scalar product or a value derived from the scalar product to a predetermined threshold. If the scalar product or the value derived from the scalar product exceeds the predetermined threshold, the second computer 806 may transmit an access token to first computer 804 (this transmission may comprise the interaction between the first computer 804 and the second computer 806).

Having received the access token from second computer 806, the first computer 804 may transmit the access token and any additional access credentials to the access terminal 808. The resource provider computer 810, operating in communication with access terminal 808, may then generate an authorization request message that includes the information received by the access terminal 808 along with any additional transaction information (e.g., a transaction amount, merchant specific information, etc.) and electronically transmits this information to acquirer computer 812. The acquirer computer 812 may then receive, process, and forward the authorization request message to the issuer computer 816 via the payment processing network 814 for authorization. The issuer computer 816 may reply with an authorization response message. The authorization response message may be transmitted from the issuer computer 816 to the access terminal 808 via the resource provider computer 810, the acquirer computer 812, and the payment processing network 814.

At the end of the day or at some other suitable time interval, a clearing and settlement process between the acquirer computer 812, the payment processing network 814, and the issuer computer 816 may be performed on the transaction.

Figure 9:
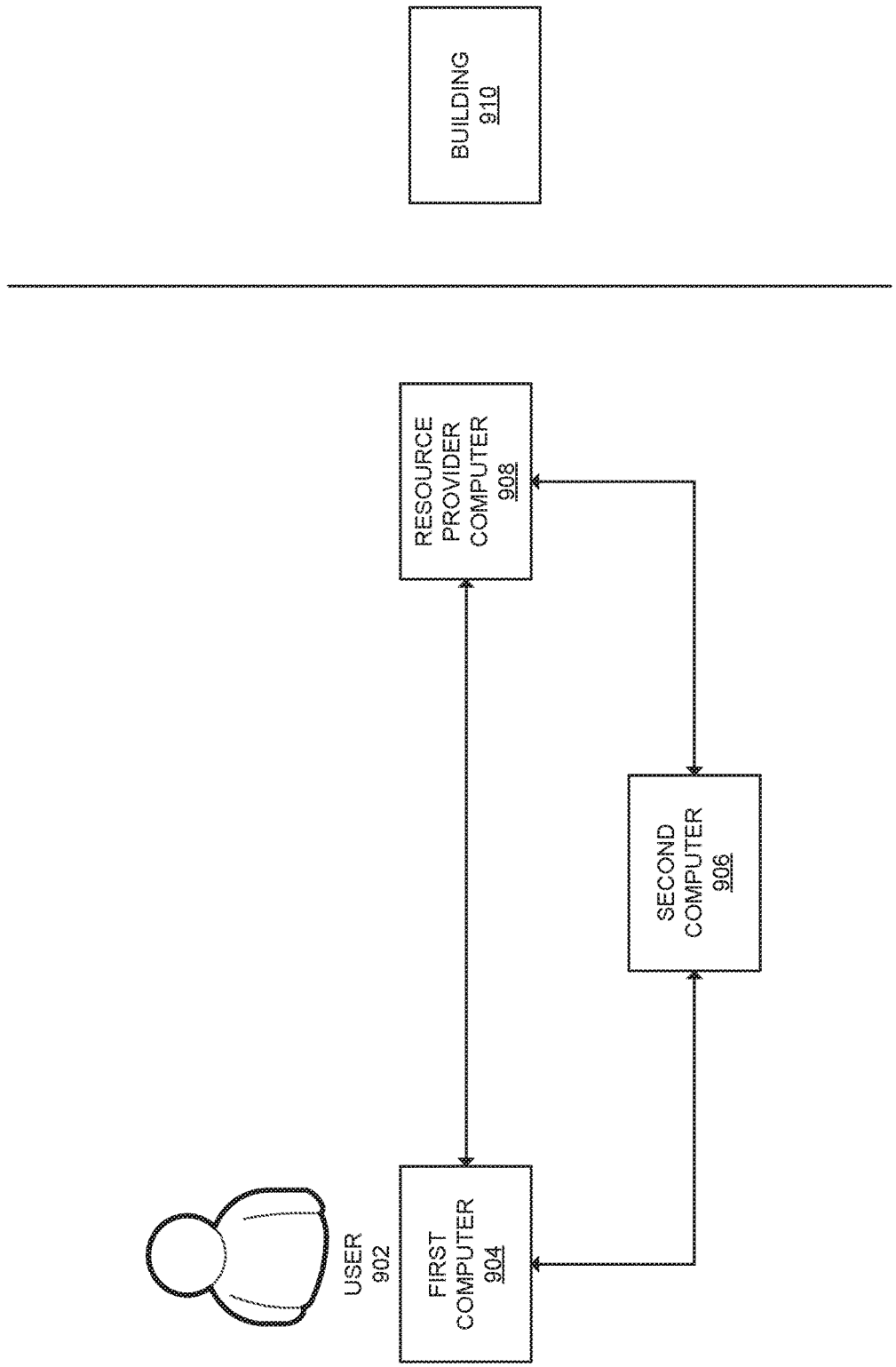
FIG. 9 shows a second exemplary interaction, comprising a building entry authentication process between a user of a first computer and a resource provider.

FIG. 9 shows a second exemplary interaction according to some embodiments. A user 902 wishes to gain access to building 910, a secure facility (i.e., a secure apartment complex or government administrative building). The door to building 910 is locked and controlled by a resource provider computer 908. In order to gain access to building 910, the user 902 needs to provide an access token or another credential to resource provider computer 908, via first computer 904 (e.g., user's 902 smart phone).

User 902 can have previously enrolled in a biometric authentication system involving a second computer 906. The second computer 906 may store a biometric vector (second vector) corresponding to user 902 in a biometric database. Similarly, the first computer 904 may store a saved biometric vector (first vector) corresponding to the user 902 on a secure element. Alternatively, the user 902 may use first computer 904 to capture a biometric instance and vectorize the captured biometric instance, e.g., by pointing a smart phone camera at their eye and taking a picture.

As part of the biometric authentication system, the first computer 904 and second computer 906 can calculate the scalar product of the first vector and second vector in order to authenticate user 902. After calculating the scalar product (as described above with reference to FIGS. 4-7), the second computer 906 can compare the scalar product or a value derived from the scalar product (e.g., the angle between the first vector and the second vector) to a predetermined threshold. If the scalar product or the value derived from the scalar product exceeds the predetermined threshold, the user 902 may be authenticated. Subsequently, the second computer 906 can transmit an instruction to the resource provider computer 908, instructing the resource provider computer 908 to open the door and allow user 902 access to building 910. Alternatively, the second computer 906 can issue an access token to first computer 904. The first computer 904 can subsequently provide this access token to resource provider 908 (e.g., via near field communication or via a network such as the Internet or a LAN). The resource provider computer 908 can verify the access token and grant user 902 access to building 910.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
    transmitting, by a first computer, to a second computer, a first public key, a second public key, a first encrypted masked vector, and a first encrypted random vector, wherein the first encrypted masked vector is a first masked vector encrypted using the first public key, and the first encrypted random vector is a first random vector encrypted using the second public key;
    receiving, by the first computer, from the second computer, a third public key, a fourth public key, a second encrypted masked vector, and a second encrypted random vector, wherein the second encrypted masked vector is a second masked vector encrypted using the third public key and the second encrypted random vector is a second random vector encrypted using the fourth public key;
    receiving, by the first computer, from the second computer, a third permuted encrypted difference vector and a fourth permuted encrypted difference vector, wherein the third permuted encrypted difference vector is encrypted using the first public key and permuted using a third permutation, and wherein the fourth permuted encrypted difference vector is encrypted using the second public key and permuted using a fourth permutation;
    producing, by the first computer, a third permuted difference vector by decrypting the third permuted encrypted difference vector using a first private key corresponding to the first public key;
    producing, by the first computer, a fourth permuted difference vector by decrypting the fourth permuted encrypted difference vector using a second private key corresponding to the second public key;
    calculating, by the first computer, a scalar product of a first vector and a second vector based on the first masked vector, the first random vector, the third permuted difference vector, and the fourth permuted difference vector;
    comparing, by the first computer, the scalar product or a value derived from the scalar product to a first predetermined threshold; and
    if the scalar product or the value derived from the scalar product exceeds the first predetermined threshold, performing, by the first computer, an interaction with the second computer.

2. The method of claim 1, wherein calculating the scalar product of the first vector and the second vector comprises:
    calculating, by the first computer, a square magnitude of the first masked vector;
    calculating, by the first computer, a square magnitude of the first random vector;
    calculating, by the first computer, a square magnitude of the third permuted difference vector;
    calculating, by the first computer, a square magnitude of the fourth permuted difference vector; and
    calculating, by the first computer, the scalar product of the first vector and the second vector based on the square magnitude of the first masked vector, the square magnitude of the first random vector, the square magnitude of the third permuted difference vector, and the square magnitude of the fourth permuted difference vector.

3. The method of claim 1, wherein before transmitting, by the first computer, to the second computer, the first public key, the second public key, the first encrypted masked vector and the first encrypted random vector, the method further comprises:

generating, by the first computer, the first random vector;
generating, by the first computer, the first masked vector by combining the first vector and the first random vector;
generating, by the first computer, a first permutation and a second permutation;
generating, by the first computer, a first key pair comprising the first public key and the first private key;
generating, by the first computer, a second key pair comprising the second public key and the second private key;
encrypting, by the first computer, the first masked vector using the first public key; and
encrypting, by the first computer, the first random vector using the second public key.

4. The method of claim 1, wherein the first public key, the first private key, the second public key, the second private key, the third public key, a third private key corresponding to the third public key, the fourth public key, and a fourth private key corresponding to the fourth public key are additive homomorphic cryptographic keys.

5. The method of claim 1, wherein before receiving, by the first computer, from the second computer, the third public key, the fourth public key, the second encrypted masked vector, and the second encrypted random vector:
the second computer generates the second random vector;
the second computer generates the second masked vector by combining the second vector and the second random vector;
the second computer generates the third permutation and the fourth permutation;
the second computer generates a third key pair comprising the third public key and a third private key;
the second computer generates a fourth key pair comprising the fourth public key and a fourth private key;
the second computer encrypts the second masked vector using the third public key; and
the second computer encrypts the second random vector using the fourth public key.

6. The method of claim 1, wherein:
the second computer generates a third encrypted negation vector by encrypting a second negation vector using the first public key;
the second computer generates a third encrypted difference vector based on the first encrypted masked vector and the third encrypted negation vector;
the second computer generates a fourth encrypted negation vector by encrypting the second negation vector using the second public key;
the second computer generates a fourth encrypted difference vector based on the first encrypted random vector and the fourth encrypted negation vector;
the second computer generates the third permuted encrypted difference vector using the third permutation and the third encrypted difference vector; and
the second computer generates the fourth permuted encrypted difference vector using the fourth permutation and the fourth encrypted difference vector.

7. The method of claim 1, wherein the first vector and the second vector correspond to a first biometric template and a second biometric template respectively, and wherein the first predetermined threshold is a biometric match threshold.

8. The method of claim 1, wherein after receiving, by the first computer, from the second computer, the third public key, the fourth public key, the second encrypted masked vector and the second encrypted random vector, and before receiving, by the first computer, from the second computer, the third permuted difference vector and the fourth permuted difference vector, the method further comprises:
generating, by the first computer, a first encrypted negation vector by encrypting a first negation vector using the third public key;
generating, by the first computer, a first encrypted difference vector based on the second encrypted masked vector and the first encrypted negation vector;
generating, by the first computer, a second encrypted negation vector by encrypting the first negation vector using the fourth public key;
generating, by the first computer, a second encrypted difference vector based on the second encrypted random vector and the second encrypted negation vector;
generating, by the first computer, a first permuted encrypted difference vector using a first permutation and the first encrypted difference vector;
generating, by the first computer, a second permuted encrypted difference vector using a second permutation and the second encrypted difference vector; and
transmitting, by the first computer, to the second computer, the first permuted encrypted difference vector and the second permuted encrypted difference vector.

9. The method of claim 8, wherein:
the second computer generates a first permuted difference vector by decrypting the first permuted encrypted difference vector using a third private key corresponding to the third public key;
the second computer generates a second permuted difference vector by decrypting the second permuted encrypted difference vector using a fourth private key corresponding to the fourth public key;
the second computer calculates the scalar product of the first vector and the second vector based on the second masked vector, the second random vector, the first permuted difference vector and the second permuted difference vector;
the second computer compares the scalar product or a value derived from the scalar product to a second predetermined threshold; and
if the scalar product or the value derived from the scalar product exceeds the second predetermined threshold, the second computer performs an interaction with the first computer.

10. A first computer comprising:
a processor; and
a non-transitory computer readable medium coupled to the processor; the non-transitory computer readable medium comprising code, executable by the processor for implementing a method comprising:
transmitting, to a second computer, a first public key, a second public key, a first encrypted masked vector, and a first encrypted random vector, wherein the first encrypted masked vector is a first masked vector encrypted using the first public key, and the first encrypted random vector is a first random vector encrypted using the second public key;
receiving, from the second computer, a third public key, a fourth public key, a second encrypted masked vector, and a second encrypted random vector, wherein the second encrypted masked vector is a second masked vector encrypted using the third public key and the second encrypted random vector is a second random vector encrypted using the fourth public key;
receiving, from the second computer, a third permuted encrypted difference vector and a fourth permuted encrypted difference vector, wherein the third permuted encrypted difference vector is encrypted using the first public key and permuted using a third permutation, and wherein the fourth permuted encrypted difference vector is encrypted using the second public key and permuted using a fourth permutation;

producing a third permuted difference vector by decrypting the third permuted encrypted difference vector using a first private key corresponding to the first public key;

producing a fourth permuted difference vector by decrypting the fourth permuted encrypted difference vector using a second private key corresponding to the second public key;

calculating a scalar product of a first vector and a second vector based on the first masked vector, the first random vector, the third permuted difference vector, and the fourth permuted difference vector;

comparing, by the first computer, the scalar product or a value derived from the scalar product to a first predetermined threshold; and if the scalar product or the value derived from the scalar product exceeds the first predetermined threshold, performing, by the first computer, an interaction with the second computer.

11. The first computer of claim 10, wherein calculating the scalar product of the first vector and the second vector comprises:

calculating a square magnitude of the first masked vector;
calculating a square magnitude of the first random vector;
calculating a square magnitude of the third permuted difference vector;
calculating a square magnitude of the fourth permuted difference vector; and
calculating the scalar product of the first vector and the second vector based on the square magnitude of the first masked vector, the square magnitude of the first random vector, the square magnitude of the third permuted difference vector, and the square magnitude of the fourth permuted difference vector.

12. The first computer of claim 10, wherein before transmitting to the second computer, the first public key, the second public key, the first encrypted masked vector and the first encrypted random vector, the method further comprises:

generating the first random vector;
generating the first masked vector by combining the first vector and the first random vector;
generating a first permutation and a second permutation;
generating a first key pair comprising the first public key and the first private key;
generating a second key pair comprising the second public key and the second private key;
encrypting the first masked vector using the first public key; and
encrypting the first random vector using the second public key.

13. The first computer of claim 10, wherein the first public key, the first private key, the second public key, the second private key, the third public key, a third private key corresponding to the third public key, the fourth public key, and a fourth private key corresponding to the fourth public key are additive homomorphic cryptographic keys.

14. The first computer of claim 10, wherein before receiving from the second computer, the third public key, the fourth public key, the second encrypted masked vector, and the second encrypted random vector:

the second computer generates the second random vector;
the second computer generates the second masked vector by combining the second vector and the second random vector;
the second computer generates the third permutation and the fourth permutation;
the second computer generates a third key pair comprising the third public key and a third private key;
the second computer generates a fourth key pair comprising the fourth public key and a fourth private key;
the second computer encrypts the second masked vector using the third public key; and
the second computer encrypts the second random vector using the fourth public key.

15. The first computer of claim 10, wherein:

the second computer generates a third encrypted negation vector by encrypting a second negation vector using the first public key;
the second computer generates a third encrypted difference vector based on the first encrypted masked vector and the third encrypted negation vector;
the second computer generates a fourth encrypted negation vector by encrypting the second negation vector using the second public key;
the second computer generates a fourth encrypted difference vector based on the first encrypted random vector and the fourth encrypted negation vector;
the second computer generates the third permuted encrypted difference vector using the third permutation and the third encrypted difference vector; and
the second computer generates the fourth permuted encrypted difference vector using the fourth permutation and the fourth encrypted difference vector.

16. The first computer of claim 10, wherein the first vector and the second vector correspond to a first biometric template and a second biometric template respectively, and wherein the first predetermined threshold is a biometric match threshold.

17. The first computer of claim 10, wherein after receiving from the second computer, the third public key, the fourth public key, the second encrypted masked vector and the second encrypted random vector, and before receiving from the second computer, the third permuted difference vector and the fourth permuted difference vector, the method further comprises:

generating a first encrypted negation vector by encrypting a first negation vector using the third public key;
generating a first encrypted difference vector based on the second encrypted masked vector and the first encrypted negation vector;
generating a second encrypted negation vector by encrypting the first negation vector using the fourth public key;
generating a second encrypted difference vector based on the second encrypted random vector and the second encrypted negation vector;
generating a first permuted encrypted difference vector using a first permutation and the first encrypted difference vector;
generating a second permuted encrypted difference vector using a second permutation and the second encrypted difference vector; and
transmitting to the second computer, the first permuted encrypted difference vector and the second permuted encrypted difference vector.

18. The first computer of claim 17, wherein:
- the second computer generates a first permuted difference vector by decrypting the first permuted encrypted difference vector using a third private key corresponding to the third public key;
- the second computer generates a second permuted difference vector by decrypting the second permuted encrypted difference vector using a fourth private key corresponding to the fourth public key;
- the second computer calculates the scalar product of the first vector and the second vector based on the second masked vector, the second random vector, the first permuted difference vector and the second permuted difference vector;
- the second computer compares the scalar product or a value derived from the scalar product to a second predetermined threshold; and
- if the scalar product or the value derived from the scalar product exceeds the second predetermined threshold, the second computer performs an interaction with the first computer.

* * * * *